(12) United States Patent  
Eisen

(10) Patent No.: US 11,750,584 B2  
(45) Date of Patent: Sep. 5, 2023

(54) SYSTEMS AND METHODS OF SHARING INFORMATION THROUGH A TAG-BASED CONSORTIUM

(71) Applicant: The 41st Parameter, Inc., Scottsdale, AZ (US)

(72) Inventor: Ori Eisen, Scottsdale, AZ (US)

(73) Assignee: The 41st Parameter, Inc., Scottsdale, AZ (US)

(*) Notice: Subject to any disclaimer, the term of this patent is extended or adjusted under 35 U.S.C. 154(b) by 0 days.

(21) Appl. No.: 16/808,938

(22) Filed: Mar. 4, 2020

(65) Prior Publication Data

US 2020/0322322 A1 Oct. 8, 2020

Related U.S. Application Data

(63) Continuation of application No. 15/913,678, filed on Mar. 6, 2018, now Pat. No. 10,616,201, which is a (Continued)

(51) Int. Cl.
*H04L 29/06* (2006.01)
*H04L 9/40* (2022.01)
(Continued)

(52) U.S. Cl.
CPC .......... *H04L 63/08* (2013.01); *H04L 63/0807* (2013.01); *H04L 63/10* (2013.01);
(Continued)

(58) Field of Classification Search
None
See application file for complete search history.

(56) References Cited

U.S. PATENT DOCUMENTS

| 4,801,924 A | 1/1989 | Burgmann et al. |
| 4,805,222 A | 2/1989 | Young et al. |
| | (Continued) | |

FOREIGN PATENT DOCUMENTS

| AU | 2022206815 | 8/2022 |
| EP | 0 418 144 | 3/1991 |
| | (Continued) | |

OTHER PUBLICATIONS

U.S. Appl. No. 12/732,034, U.S. Pat. No. 9,112,850, Systems and Method of Sharing Information Through a Tag-Based Consortium, filed Mar. 25, 2010.

(Continued)

*Primary Examiner* — Benjamin E Lanier
(74) *Attorney, Agent, or Firm* — Knobbe, Martens, Olson & Bear, LLP

(57) ABSTRACT

The invention provides one or more consortia of networks that identify and share information about users and/or user devices interacting with the consortia. User devices may be identified, at least in part, by tag-based computer information. Computers and other devices accessing the Web carry device tags with date and time information describing when they were issued by a security tag server. A server time stamp may be inserted into time based computer tags such as a cookies indicating when they were created. Such time stamp information can be encrypted and analyzed during future attempts to access a secure network such as a customer attempting to log into an online banking account. When the time stamp information from the tag is compared to other selected information about the user, device and/or account, including but not limited to last account log-in date/time or account creation date, the invention may be used to detect suspicious activity. The invention may be use for identity-based applications such as network security, the (Continued)

detection of fraudulent transactions, identity theft, reputation-based communities, and law enforcement.

20 Claims, 7 Drawing Sheets

Related U.S. Application Data continuation of application No. 14/826,107, filed on Aug. 13, 2015, now Pat. No. 9,948,629, which is a continuation of application No. 12/732,034, filed on Mar. 25, 2010, now Pat. No. 9,112,850.

(60) Provisional application No. 61/163,430, filed on Mar. 25, 2009.

(51) Int. Cl.
  *G06Q 40/02* (2023.01)
  *G06Q 50/26* (2012.01)
(52) U.S. Cl.
  CPC ...... *H04L 63/1408* (2013.01); *H04L 63/1483* (2013.01); *G06Q 40/02* (2013.01); *G06Q 50/265* (2013.01); *G06Q 2220/00* (2013.01)

(56) References Cited

U.S. PATENT DOCUMENTS

| | | |
|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,206,938 B2 | 4/2007 | Bender et al. |
| 7,221,949 B2 | 5/2007 | Clough |
| 7,225,974 B2 | 6/2007 | Yamauchi |
| 7,237,717 B2 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |

(56) References Cited

U.S. PATENT DOCUMENTS

| | | |
|---|---|---|
| 7,359,962 B2 | 4/2008 | Willebeek-Lemair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,386,892 B2 | 6/2008 | Gilfix et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 * | 12/2009 | Collins ............... G06Q 10/025 705/35 |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,769,032 B1 | 8/2010 | Ou |
| 7,778,846 B2 | 8/2010 | Suresh et al. |
| 7,788,195 B1 | 8/2010 | Subramanian et al. |
| 7,813,937 B1 | 10/2010 | Pathria et al. |
| 7,813,944 B1 | 10/2010 | Luk et al. |
| 7,814,029 B1 | 10/2010 | Siegel |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,490 B1 | 7/2011 | Minter |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,308 B1 | 7/2012 | Gavrylyako et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |

(56) References Cited

U.S. PATENT DOCUMENTS

| | | |
|---|---|---|
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 | 1/2014 | Haveliwala et al. |
| 8,660,539 B2 | 2/2014 | Khambete et al. |
| 8,661,119 B1 | 2/2014 | Jindal et al. |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominguez |
| 8,701,168 B2 | 4/2014 | Sastry et al. |
| 8,701,170 B1 | 4/2014 | Barber |
| 8,725,570 B2 | 5/2014 | Doughty et al. |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 | 11/2014 | Xu et al. |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,037,483 B1 | 5/2015 | Curcio et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 | 12/2015 | Dandu et al. |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B1 | 12/2016 | Guan et al. |
| 9,514,446 B1 | 12/2016 | Rajkumar et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,123,368 B2 | 11/2018 | Gundavelli et al. |
| 10,231,120 B2 | 3/2019 | Nethi et al. |
| 10,248,968 B2 | 4/2019 | Sivaramakrishnan et al. |
| 10,290,017 B2 | 5/2019 | Traasdahl et al. |
| 10,305,880 B2 | 5/2019 | Barber |
| 10,321,309 B2 | 6/2019 | Lee et al. |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,510,094 B2 | 12/2019 | Sivaramakrishnan et al. |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,956,732 B2 | 3/2021 | Henaff |
| 10,984,128 B1 | 4/2021 | Hoffer |
| 10,999,298 B2 | 5/2021 | Eisen |
| 11,010,468 B1 | 5/2021 | Katz |
| 11,095,643 B2 | 8/2021 | Huffman et al. |
| 11,176,200 B2 | 11/2021 | Barber |
| 11,176,573 B2 | 11/2021 | Barber |
| 11,177,967 B2 | 11/2021 | Pala |
| 11,195,225 B2 | 12/2021 | Eisen |
| 11,223,621 B2 | 1/2022 | Cano et al. |
| 11,238,456 B2 | 2/2022 | Eisen |
| 11,240,326 B1 | 2/2022 | Khanwalkar et al. |
| 11,301,585 B2 | 4/2022 | Eisen et al. |
| 11,301,860 B2 | 4/2022 | Eisen |
| 11,314,838 B2 | 4/2022 | Liodden et al. |
| 11,410,179 B2 | 8/2022 | Eisen |
| 2001/0011243 A1 | 8/2001 | Dembo et al. |
| 2001/0011304 A1 | 8/2001 | Wesinger et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |

(56) References Cited

U.S. PATENT DOCUMENTS

| | | |
|---|---|---|
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0021360 A1 | 1/2005 | Miller et al. |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0154676 A1 | 7/2005 | Ronning et al. |
| 2005/0165643 A1 | 7/2005 | Wilson et al. |
| 2005/0185225 A1 | 8/2005 | Brawn et al. |
| 2005/0187883 A1 | 8/2005 | Bishop et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0216278 A1 | 9/2005 | Eisen |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0192240 A1* | 8/2007 | Crooks .............. G06Q 20/10 705/38 |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |

(56) References Cited

U.S. PATENT DOCUMENTS

| | | |
|---|---|---|
| 2007/0234070 A1 | 10/2007 | Horning et al. |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Chen et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0037213 A1 | 2/2009 | Eisen |
| 2009/0037602 A1 | 2/2009 | Patel et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0083184 A1 | 3/2009 | Eisen |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0198629 A1 | 8/2009 | De Prisco et al. |
| 2009/0205031 A1 | 8/2009 | Sato et al. |
| 2009/0222308 A1 | 9/2009 | Zoldi et al. |
| 2009/0228340 A1* | 9/2009 | Bohannon .......... G06Q 30/0217 |
| | | 705/14.53 |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | McDowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2009/0327333 A1 | 12/2009 | Diener et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228624 A1 | 9/2010 | Morris et al. |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0262467 A1 | 10/2010 | Barnhill, Jr. et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0082768 A1 | 4/2011 | Eisen |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0113388 A1 | 5/2011 | Eisen et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |

(56) References Cited

U.S. PATENT DOCUMENTS

| | | |
|---|---|---|
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0313847 A1 | 12/2011 | Cao et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0036261 A1 | 2/2012 | Salazar et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0096557 A1 | 4/2012 | Britton et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0271860 A1 | 10/2012 | Graham, Jr. et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1 | 11/2012 | Colbert et al. |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0324060 A1 | 12/2012 | Afergan et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0097706 A1 | 4/2013 | Titonis et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0144539 A1 | 6/2013 | Allen et al. |
| 2013/0148525 A1 | 6/2013 | Cuadra Sanchez et al. |
| 2013/0159192 A1 | 6/2013 | Partridge et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0217330 A1 | 8/2013 | Gardenfors et al. |
| 2013/0226692 A1 | 8/2013 | Kouladjie et al. |
| 2013/0226717 A1 | 8/2013 | Ahluwalia et al. |
| 2013/0253965 A1 | 9/2013 | Joseph |
| 2013/0273879 A1 | 10/2013 | Eisen et al. |
| 2013/0290119 A1 | 10/2013 | Howe et al. |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0122697 A1 | 5/2014 | Liu et al. |
| 2014/0129322 A1 | 5/2014 | George et al. |
| 2014/0148197 A1 | 5/2014 | Shields |
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1 | 2/2015 | Stewart |
| 2015/0046989 A1 | 2/2015 | Oberheide et al. |
| 2015/0088980 A1 | 3/2015 | Lakes et al. |
| 2015/0106198 A1 | 4/2015 | Miller et al. |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1 | 5/2015 | Wu et al. |
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0235258 A1 | 8/2015 | Shah et al. |
| 2015/0235275 A1 | 8/2015 | Shah et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0326517 A1 | 11/2015 | Block et al. |
| 2015/0350856 A1 | 12/2015 | Circosta et al. |
| 2016/0019546 A1 | 1/2016 | Eisen |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0182657 A1 | 6/2016 | Mukherjee et al. |
| 2016/0246581 A1 | 8/2016 | Jimenez et al. |
| 2016/0275545 A1 | 9/2016 | Dasdan et al. |
| 2016/0321701 A1 | 11/2016 | Artman et al. |
| 2016/0328710 A1 | 11/2016 | Britton et al. |

(56) References Cited

U.S. PATENT DOCUMENTS

| | | |
|---|---|---|
| 2017/0039571 A1 | 2/2017 | Eisen |
| 2017/0053208 A1 | 2/2017 | Krishnamurthy et al. |
| 2017/0142106 A1 | 5/2017 | Eisen et al. |
| 2017/0364918 A1* | 12/2017 | Malhotra ............... G06Q 20/36 |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0227299 A1 | 8/2018 | Varon et al. |
| 2018/0322500 A1 | 11/2018 | Eisen |
| 2019/0028472 A1 | 1/2019 | Eisen |
| 2019/0066192 A1 | 2/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0034845 A1 | 1/2020 | Eisen |
| 2020/0064444 A1 | 2/2020 | Regani et al. |
| 2020/0092287 A1 | 3/2020 | Cano et al. |
| 2020/0218763 A1 | 7/2020 | Barber |
| 2020/0219173 A1 | 7/2020 | Eisen |
| 2020/0226186 A1 | 7/2020 | Liodden et al. |
| 2020/0294086 A1 | 9/2020 | Traasdahl et al. |
| 2020/0380162 A1 | 12/2020 | Eisen et al. |
| 2021/0224811 A1 | 7/2021 | Eisen |
| 2021/0226950 A1 | 7/2021 | Eisen |
| 2021/0281580 A1 | 9/2021 | Eisen |
| 2021/0336955 A1 | 10/2021 | Huffman et al. |
| 2022/0043881 A1 | 2/2022 | Putnam et al. |
| 2022/0129969 A1 | 4/2022 | Eisen |
| 2022/0269818 A1 | 8/2022 | Eisen |
| 2022/0270100 A1 | 8/2022 | Eisen |
| 2023/0046734 A1 | 2/2023 | Eisen |

FOREIGN PATENT DOCUMENTS

| | | |
|---|---|---|
| EP | 0 645 692 | 3/1995 |
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| EP | 2 323 091 | 5/2011 |
| EP | 3 583 758 | 4/2021 |
| EP | 3 937 456 | 1/2022 |
| GB | 2 491 101 | 11/2012 |
| GB | 2 492 604 | 1/2013 |
| GB | 2 494 098 | 3/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 20090012013 A * | 2/2009 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 97/023816 | 7/1997 |
| WO | WO 99/050775 | 10/1999 |
| WO | WO 01/011450 | 2/2001 |
| WO | WO 01/033520 | 5/2001 |
| WO | WO 01/086877 | 11/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2011/081818 | 7/2011 |
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2014/078569 | 5/2014 |
| WO | WO 2017/040799 | 3/2017 |
| WO | WO 2018/129373 | 7/2018 |

(56) References Cited

FOREIGN PATENT DOCUMENTS

| | | |
|---|---|---|
| WO | WO 2018/151822 | 8/2018 |
| WO | WO 2022/104341 | 5/2022 |

OTHER PUBLICATIONS

U.S. Appl. No. 14/826,107, U.S. Pat. No. 9,948,629, Systems and Method of Sharing Information Through a Tag-Based Consortium, filed Aug. 13, 2015.
U.S. Appl. No. 15/913,678, U.S. Pat. No. 10,616,201, Systems and Method of Sharing Information Through a Tag-Based Consortium, filed Mar. 6, 2018.
U.S. Appl. No. 12/732,034, Eisen.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Wore", Millennium Edition, Que Corporation, Indianapolis, IN, Sep. 2000, pp. 230.
Gralla, Preston, "How the Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Wore", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Provisional Application as filed in U.S. Appl. No. 61/324,312, dated Apr. 15, 2010 in 15 pages.
Official Communication in European Patent Application No. 19189189.4, dated Jan. 21, 2020.
Bourobou et al., "User Activity Recognition in Smart Homes Using Pattern Clustering Applied to Temporal ANN Algorithm", Sensors, May 21, 2015, vol. 15, pp. 11953-11971.
Elkhodr et al., "A Review of Mobile Location Privacy in the Internet of Things", 2012 Tenth International Conference on ICT and Knowledge Engineering, 2012, pp. 266-272.
Kisel et al., "Utilizing a Personalization-Enabled Access Node in Support of Converged Cross-Domain Scoring and Advertising", Bell Labs Technical Journal, 2010, vol. 15, No. 1, pp. 77-94.
Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.
Quora, [No Author Listed], How does a tracking pixel work? by Quora, 2011.
Official Communication in European Patent Application No. 19189189.4, dated Nov. 19, 2020.
Summons to Attend Oral Proceedings received in European Application No. EP08159110, dated Jul. 23, 2020.
Official Communication received in European Patent Application No. 16766741.9, dated Aug. 20, 2019.
Summons to Attend received in European Patent Application No. 16766741.9, dated Mar. 25, 2020.
Official Communication received in European Patent Application No. 21154719.5, dated Jun. 15, 2021.
International Search Report and Written Opinion for Application No. PCT/US2012/065220, dated Mar. 21, 2013.
International Preliminary Report on Patentability in Application No. PCT/US2012/065220, dated May 30, 2014.

(56) References Cited

OTHER PUBLICATIONS

International Search Report and Written Opinion for Application No. PCT/US2016/049930, dated Nov. 9, 2016.
Official Communication in European Patent Application No. 19181057.1, dated Oct. 25, 2021.
Shabtai et al., "'Andromaly': A Behavioral Malware Detection Framework for Android Devices", Journal of Intelligent Information Systems, 2012, vol. 38, pp. 161-190.
Eckersley, Peter, "How Unique Is Your Web Browser?", Electronic Frontier Foundation, 2010, pp. 19.
Faulkner, Alisdair, "Fraud Network Whitepaper", ThreatMetrix, Whitepaper, 2010, pp. 16.
Schmücker, Niklas, "Web Tracking", SNET2 Seminar Paper—Summer Term 2011, Berlin University of Technology, pp. 12.

\* cited by examiner

| TAG | TIME STAMP |
|---|---|
| TAG #1 | 7/12/07 |
| TAG #2 | 6/10/07 |
| TAG #3 | 5/1/06 |
| TAG #4 | 7/15/07 |
| TAG #5 | 7/14/07 |
| ... | ... |

FIG. 4

SYSTEMS AND METHODS OF SHARING INFORMATION THROUGH A TAG-BASED CONSORTIUM

CROSS-REFERENCE

This application is a continuation application of U.S. patent application Ser. No. 15/913,678, filed Mar. 6, 2018, which is a continuation application of U.S. patent application Ser. No. 14/826,107, filed Aug. 13, 2015, now U.S. Pat. No. 9,948,629, issued Apr. 17, 2018, which is a continuation application of U.S. patent application Ser. No. 12/732,034, filed Mar. 25, 2010, now U.S. Pat. No. 9,112,850, issued Aug. 18, 2015, which claims the benefit of priority to U.S. Provisional Application No. 61/163,430, filed Mar. 25, 2009, where each of above-cited applications is hereby incorporated herein by reference in its entirety.

FIELD OF THE INVENTION

The invention relates to network security and the detection of fraudulent transactions and identity theft. More particularly, the invention relates to one or more consortia of computer networks that identify and share information about users and/or computing devices.

BACKGROUND OF THE INVENTION

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user name, address, phone number, and e-mail address will not suffice to detect and determine a probable fraudulent transaction because such information can be altered, manipulated, fraudulently obtained, or simply false.

Furthermore, a fraudulent user may conduct transactions with numerous websites or online businesses. One website merely relying on information gathered during previous transactions with that particular website may limit the scope of fraud prevention potential.

Accordingly, what is needed is a method and system that overcomes the problems associated with a typical verification and fraud prevention system for Internet transactions by identifying each user and/or user device and sharing that information. Then, when a user seeks a second fraudulent transaction, whether the transaction is with the same or different website, the website operator may detect the fraud and take appropriate action.

SUMMARY OF THE INVENTION

The invention provides methods and apparatus for providing network security. Various aspects of the invention described herein may be applied to any of the particular applications set forth below or for any other types of networks that is secured and user accessible. The invention may be applied as a standalone tool or as part of an integrated software solution against online fraud and identify theft. The invention may include a consortium of online hosts that may share information with one another as a measure of fraud prevention. Some preferable embodiments of the invention can be optionally integrated into existing networks and business processes seamlessly including those used by financial and banking institutions. It shall be understood that different aspects of the invention can be appreciated individually, collectively or in combination with each other.

The invention provides systems and methods that identify or differentiate users and/or user devices connecting to a network. Information about a user or user device may be collected during a transaction between a user device and an online host. In some embodiments, a device identifier may be assigned to a user device. Furthermore, tag-based information, such as information about whether a tag resides on a user device and any information provided by the tag, may be collected. This information can be used to observe user behavior and activity, such as an account connecting from many different devices, or many accounts connecting from the same device. Such information may help validate devices and the status of the device may be verified as acceptable to the online business based on the status rules of the online business. In addition, this information can be used to cross-reference computing devices used by known fraudulent accounts, and cross-reference other accounts used by specific devices. In some cases, the online hosts may communicate with an authentication repository, which may also include a centralized database of gathered information, such as device identifiers, device tag-based information, or fraud history, that can be updated and shared.

Accordingly, computing devices involved in suspicious or fraudulent activity, or devices associated with accounts involved in suspicious activity can be identified. This information can be shared with other online hosts and networks within one or more consortia. In this way, computer devices associated with suspicious or fraudulent activity on one network may be denied access to other networks.

The invention may be applied to provide a fraud detection and prevention system that can significantly reduce the risk associated with Internet transactions and fraud. By sharing information about potentially fraudulent users or devices, and identifying user devices as well as their association with certain online activity, the system may allow businesses to avoid problem customers or devices associated with fraudulent activity. The system can track device activity and user behavior over selected periods of time, thereby identifying suspicious activity based on selected parameters established by online businesses.

Information shared across a consortium may include tag-based information from a device. A device may have a tag, which may include information, such as information about a device and a time stamp, which may be associated with a device identifier. In some instances, the tag may be a cookie, local shared object, flash object, text protocol, lines of code, or any type of object or application that may be on the memory of a device. Any discussion of any type of a tag (e.g., a cookie), may also apply to any other type of tag. Information shared across a consortium may also include information from a tag of a device, or about a tag of the device, which may be associated with a device identifier.

In accordance with another aspect, the invention provides systems and methods for creating and analyzing computer tag information for the prevention or detection of potential fraud. Computers and other devices that access the Web may carry device tags in accordance with a preferable embodiment of the invention. These device tags may include date and time information that describes when they were issued by a security tag server. For example, a server time stamp may be inserted into in a computer tag such as a cookie indicating when it was created. In a preferable embodiment of the invention, the computer tag may be a time stamped cookie that includes "date of creation" or "created" data portions. More preferably, such tag-generation time stamp information can be encrypted and not apparent as is most cookie related information. Thus, a time-encrypted cookie may be utilized for fraud detection or other applications.

The computer tags provided herein may be analyzed during future attempts to access a secure network such as a customer attempting to log into an online banking account. When the time stamp information from the tag is compared to other selected information about the account, including but not limited to last account log-in date/time or account creation date, the invention may be able to detect suspicious activity. For example, recently issued computer tags may be flagged as suspicious for accounts that have not been logged into for a long time or for online accounts that were created for quite some time. Accordingly, physical devices involved in suspicious or fraudulent activity, or devices associated with accounts involved in suspicious activity can be prevented from connecting to a network. Such information may be incorporated into a tag-based consortium which may share tag-based information between online hosts.

Another embodiment of the invention provides an advanced fraud detection and prevention system that can reduce the risk of Internet fraud and identity theft. The system allows a business to detect a potential problem or hacker by spotting a relatively large number or cluster of recently issued computer tags over a period of time. This may suggest suspicious or illegal behavior based on parameters established by online merchants and others conducting business on the Internet including banks and financial institutions. The system may also analyze other parameters, such as device timestamp format, for suspicious activity. This information can be also used so that a business can make educated decisions about how or whether to authenticate users or customers based at least in part on time stamps, which may be encrypted preferably. The relevant times of when tags and how many are issued for network devices may be also considered in comparison to the history of accounts or resources to which those devices are attempting to access. Businesses within a consortium may share this tag-based information to expand the field of knowledge that may help detect suspicious or illegal behavior.

In yet another embodiment of the invention, a method is provided for detecting fraud during a connection of a network device or computer to a server, such as a financial institution server. Any discussion of financial institution server herein may apply to other types of servers, such as any online organization, merchant, or host server, or consortium server, and vice versa. Initially, an application is launched on a network device such as a Web browser through which an online session can begin. The financial server may determine that the network device is a registered network device having an assigned computer tag with embedded server time stamp information. In preferable embodiments the computer tag may be a cookie or other tag with server time stamp information indicating when it was created. The cookie may include the tag-generation time stamp. The computer tag is then forwarded to a fraud detection system within a secure network environment in which the financial institution server also resides. In some instances, the fraud detection system may include a plurality of financial institution servers, such that various financial institutions within the fraud detection system may share information about the computer tag. The fraud detection system then analyzes the creation or issued date of the computer tag from the network device to determine if there is suspected fraud or unauthorized access. This analysis may include decryption procedures when the time stamp information is preferably encrypted. If the server time stamp information does not suggest fraudulent or improper activity, then access to the financial server is granted to the network device.

Another embodiment of the invention provides a network security and fraud detection/prevention system. The system protect a secure network with at least one web server and a network device that connects to the web server over a communications network such as the Internet. The web server may include a fraud detection means that analyzes a time stamped computer tag stored on the network device. When the network device connects to the web server, information is gathered about the network device tag to determine when it was created by the fraud detection means. The fraud detection means may also include a database and means for receiving the time stamped computer tag, storing the tag in the database and associating the tag with user information for possible future use in identifying discernable commonalties or patterns of fraudulent behavior. In some instances, the database may be a database that is shared by a plurality of web servers. In other instances, a plurality of databases are provided wherein data from the databases may be shared or scanned.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

FIG. 4 is a table of tag information with corresponding time stamps that may be analyzed by fraud detection systems provided in accordance with the invention.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods that identify users and/or user devices connecting to a network. The invention may also relate to one or more consortia of communication networks that share information about users or user devices. Alternatively, aspects of the invention may be implemented without a consortium, such that the systems and methods may be within a single communication network. The invention is applicable to network security and the detection of fraudulent transactions and identity theft. It will be appreciated, however, that the systems and methods in accordance with the invention can have greater utility; for example, the invention may also be applicable to any reputation based system where a user or user device identification may be relevant. One aspect of the invention is creating associations, tracking behavior over time, and sharing information with multiple networks or businesses that stand to benefit from sharing this type of information.

The invention may be applicable to any type of transaction in which it may be desirable to identify a user or device. For example, the invention may be used to detect fraud being carried out by one or more network devices and user accounts over a communications network, or even detecting and preventing potential fraud or identity theft by individuals trying to complete a transaction remotely by phone or mail, or even in person. One aspect of this system and method is to associate pieces of information about a transaction, monitor these associations, and share the information about these associations with other businesses within one or more consortia.

Figure 1:
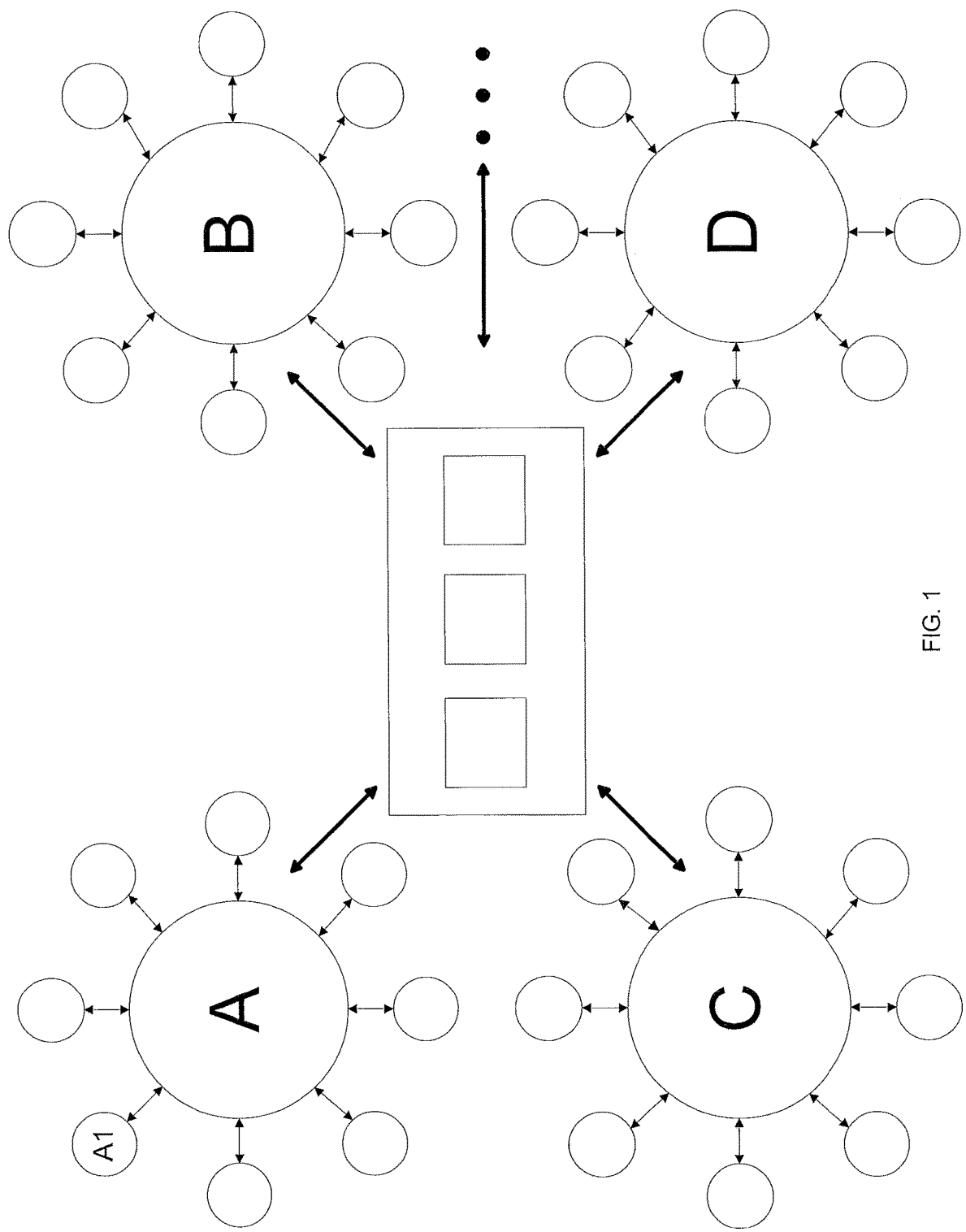
FIG. 1 is a diagram illustrating a consortium having one or more user devices being connected to one or more online businesses that share user device information with an authentication repository that is part of the consortium in accordance with the invention.

FIG. 1 is a diagram illustrating a consortium having one or more user devices being connected to one or more online organizations or hosts that share user device information with an authentication repository that is part of the consortium in accordance with one embodiment of the invention. The one or more user devices may include user computers whether they be a personal computer, server computer, or laptop computer; personal digital assistants (PDAs) such as a Palm-based device or Windows CE device; phones such as cellular phones; a wireless device such as a wireless email device or other device capable of communicating wirelessly with a computer network; any computing resource that has the processor, memory and input/output capabilities to be able to communicate with a computer network and handle electronic transactions; or any other type of network device that may communicate over a network and handle electronic transactions.

The user device may also be a telephone, for example, to order items from a mail order catalog. For many applications of the invention, the user device is a personal computer with a display such as cathode ray tube or liquid crystal display (LCD) for displaying information and images to the user of the user device. One or more input/output devices such as keyboards and a mouse permit the user to operate the user device and to permit it to access the Web. The device can be connected to a communications network via a network interface card, cable modem, a DSL modem, wireless modem, telephone line modem and other hardware. The user device may further comprise one or more processors, memory storage devices, including an optical tape drive or optical drive, a hard disk drive, or flash memory, so the device memory can store data even when the computer system is powered down. Also other a memory such as SRAM, DRAM, or SDRAM may be included to temporarily store data being executed by the processor. Any discussion of a user device or any particular type of user device may be applicable to any other type of user device.

The online organizations connected to the one or more user devices may be any sort of host, such as an electronic commerce business, an online merchant, a financial institution, or any other type of website service provider that may provide a service to a user or may interact with a user device. Any discussion herein of any of the various types of online organizations or hosts may apply to any other type of online organization or host. An online organization and a user device may perform an electronic transaction, such as a purchase of a product or service, such as online banking. In accordance with one aspect of the invention, each electronic transaction may be susceptible to fraud and each user device or user can be identified to reduce the risk of fraud.

The connection between a user device and an online organization may be, for example, a connection between a client computer and a website server over a network. One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. Each user device may connect to any online organization over the network using data protocols, such as HTTP, HTTPS and the like.

When a user device is communicating with the consortium, the device memory may store an operating system (OS) and a browser application. For example, the operating system may operate to display a graphical user interface to the user and permit the user to execute other computer programs, such as the browser application. The browser application, such as Microsoft Internet Explorer, when executed by the processor, permits the user to access the World Wide Web as is well known. The user device may interact with an online organization that is part of the consortium, which may perform some fraud prevention and detection functions and may generate a device identifier in accordance with the invention. The online organization or consortium may also generate a tag for a user device, provide a tag to the user device, read tag information from the user device, retrieve a tag from the user device, and/or analyze tag information from the user device.

In some embodiments, an online organization may have one or more web-based server computers, such as a web server, an application server, a database server, etc., that are capable of communicating with a user device over a network, such as the Internet or a wireless network, and are capable of downloading web pages to the user device. In some implementations, the online organization may comprise one or more processors, one or more persistent storage devices and a memory. For the online organization to interact with the user devices, the memory may store (and the processor(s) may execute) a server operating system and a transaction processing software system to facilitate an electronic transaction between the online organization and one or more user devices. Each online organization may further comprise a database, such as a database server or a data structure stored in the memory of the online organization, that stores the electronic transaction data for the online organization. In some embodiments, a server for an online organization may have greater computing or processing power than a user device. Similarly, the server may have more memory than a user device.

The online organization may control each device and/or each user's access to the resources of the online organization by, for example, denying access to a user or device in particular circumstances. For example, if a user device has been implicated in fraud, an online organization may prevent a transaction with the user device from occurring. In another example, if a user has a 'bad' or 'low' reputation, an online organization may prevent the user from participating in an electronic sales forum.

In a preferable embodiment of the invention, the online organizations may be connected to an authentication repository. The authentication repository or fraud detection monitor that is part of a fraud detection consortium may be connected to the online organizations over a network. If the central repository is connected to the network, then the data between the online organizations and the authentication repository may be encrypted or may travel over a virtual private network to ensure privacy and security.

Thus, the authentication repository may receive user and/or user device information (such as tag-based information) from each online organization, which may collect user or user device information from each user device during an online transaction. The repository may store some or all of the information received. In some implementations, the authentication repository may generate a device identifier that identifies each user device. In some cases, the device identifiers may be unique identifiers for each user device. In other cases, the device identifiers may not be unique for each user device, but may be derived from information gathered about a user and/or user device which may or may not be duplicative in another user device. In some cases, a device identifier may function as a "fingerprint" of a user device, and include various parameters derived from gathered information about a user and/or user device. In some embodiments, parameters derived from information about a user and/or device may be provided in addition to a device identifier.

Using the user and/or user device information in accordance with the invention, the authentication repository may be able to detect fraudulent activities across the consortium. In particular, the authentication repository may provide a centralized service utilizing this invention to identify user devices, store user and device information (such as tag-based information), identify suspicious activity from shared user and/or device information, track end-user logins, associate an end-user account with one or more specific devices, associate a device with one or more end-user accounts, associate a device or end-user with fraudulent activity, and share this information with each online organization of the consortium. The authentication repository may include a centralized database.

Any action taken within a fraud detection consortium may be directed by computer readable media, code, instructions, or logic thereof. These may be stored in a memory, such as a memory of an authentication repository or the memory of an online organization.

In one example, a user computer, such as A1, may request access to the fraud detection consortium and a particular online business, such as A. To gain access to A, complete a transaction, or access a particular part of the network, a user may connect through a user device, which in this case may be user computer A1. The online business A may receive user and/or user information from the user computer and may then pass the information to the authentication repository. The online business may or may not store the information gathered through the user device that is passed onto the authentication repository.

In some implementations, the authentication repository may generate a computer identifier which may be derived from the information gathered. In other implementations, a computer identifier may be generated at different stages. For example, an online business A may gather information from A1 and may generate a computer identifier for A1, and may pass the computer identifier to the authentication repository. The online business A may only pass the computer identifier, may only pass gathered information, or may pass a combination of both to the authentication repository.

Information or data, such as a computer identifier, raw data, data used to make up the computer identifier, or any combination thereof may be stored in "pairs." Any type of data may be coupled with the same or different type of data when stored in memory. The paired data may be linked within memory where they are stored, or may have some other mechanism that associates them with one another. In one example, an email address and a computer identifier may be stored as a pair. The email address and computer identifier may be stored in memory together, as a unit of data. Alternatively, they need not be stored together but may include pointers that associate them with one another. In another example, a time stamp and other information from a computer tag may be stored as a pair. Although the term "pair" may be used, any number of data items may be linked in memory. For example, two, three, four, five, six, seven, eight, ten, twelve, fifteen, twenty, thirty, forty, fifty, eighty, one hundred, two hundred, or more items may be linked in memory. As discussed in greater detail below, any of these linked sets of data may be shared together.

The authentication repository may also generate and/or provide a tag for a user device. The tag may or may not include information derived or gathered from the user device. In some implementations, the authentication repository may provide an application or instructions that may enable a tag to be generated at the user device. The authentication repository may provide a tag or application that enables generation of a tag to a user device A1 through an online business A, or may provide the tag or application directly to the user device A1. Alternatively, the online business A may provide the tag or application to the user device. In some implementations, the online business A may receive the capability to provide a tag or application from the authentication repository or other party, while in other implementations, the online business may not require another party to provide the tag or tag-generating application. In some embodiments, the tag-generating application may be a script, such as a Javascript.

The authentication repository and/or the online organization A may be able to read or receive tag-based information from the user device A1. In some embodiments an application or executable instructions (such as a script) may be provided to the user device A1 to determine if a tag is present on A1, and if present on A1 send the tag or information collected from the tag to the authentication repository and/or online organization. Tag-based information may be utilized with other implementations of a system. See, e.g., U.S. Pat. No. 7,330,871, which is hereby incorporated by reference in its entirety.

In one embodiment, the authentication repository may store some or all of the information. For example, the authentication repository may store all of the information gathered by online business A, B, C, D, and any other businesses in the consortium. Online businesses A, B, C, and D may or may not also store the information that is stored by the authentication repository. The authentication repository may share some or all of the information gathered or generated, such as device identifiers, tag-based information, or detected fraud information, with the online businesses of the consortium.

In an alternate embodiment, the fraud detection monitor or repository may facilitate transfer of information between one or more online business without actually storing the gathered information. For example, information gathered by online business A may be stored on A's server, and information gathered by online business B may be stored on B's server. The fraud detection monitor may enable transfer of information from A to B, C, D, and any other businesses and so forth for the other online businesses. The fraud detection monitor may also process information, with or without storing it on a fraud detection monitor server, such as generating computer identifiers or detecting fraud from information gathered from one or more online business, and may share this information with the online businesses of the consortium. The fraud detection monitor may detect fraud by cross referencing the gathered information and tracking user and device behavior over time. In some cases, the fraud detection monitor may only store processed information, such as device identifiers or fraud indicators.

In some embodiments, each online business may represent different private network environments operated by independent organizations that do not share end-user identities. The data storage system, such as a set of databases, used by each online business may be remotely located at the authentication repository and can be a service provided by a third party. Alternatively, online businesses may communicate via a network, such as the Internet, such that end-user identifiers may be shared.

Another example provides fraud detection and information processing applications distributed across a plurality of computing devices (with no central authentication repository and database). The computing devices may be the online businesses' devices, the user devices, or a combination of the user devices and online businesses, such that each may perform part of the functions of the fraud detection and prevention system in accordance with the invention. For instance, the various online businesses may share information with one another in a peer to peer manner, and may collectively detect fraud. In one case, online business A may detect an at-risk user device and share this information with online businesses B, C, D, and so forth. Online businesses A, B, C, and D may share information in a peer to peer manner such that they all have access to certain information.

Those skilled in the art will appreciate that the fraud detection consortium may be implemented in various different manners that are within the scope of this invention, such that previous discussions are provided by way of example only and are not limiting.

One aspect of the invention provides for multiple consortia that may interact with one another and share information. For example, an authentication repository may communicate with another authentication repository. In some embodiments, information gathered from an online business may be shared between one or more authentication repositories, which may subsequently share the information with the other online businesses that they are connected to. In some implementations, the information shared between a first repository and second repository may be stored by both the first and second repositories before being distributed to connected online businesses. Alternatively, a repository may merely pass on information it receives from another repository. The information may be stored or shared in various ways that are known in the art.

For instance, any information stored by an authentication repository may be stored in one or more database of the authentication repository. In one example, the database may have a database table containing pertinent information. However, the data may be stored in different databases and may include different database data structures that are within the scope of this invention. In this example, a database table may include a host column, a unique user-account name column, tag-based information column, various parameter columns, and/or a user device identifier column that may permit the fraud detection system to associate a particular host (or online business) with a particular user and a particular user device. As described above, the user-account name and/or device identifier may represent end-user accounts that are unique to each host. The tag-based information may be derived from user devices that have connected to at least one host. The individual rows in the database table may represent unique combinations of host, user-account names, tag-based information, parameters, and/or user device identifiers.

As previously discussed, information may be stored in "pairs," which may refer to any number of data items that may be somehow linked or connected together. A database table, as mentioned previously, may be an implementation of storing data in pairs. In a consortia or multiple consortia, such information may also be shared in "pairs." For example, a particular host may always link together a time stamp for a tag and other information stored within a tag. Such information may be stored and shared as a pair. In some embodiments, each host may have uniform pairs of data that may be shared. For instance, all of the hosts within an online consortium may store together a time stamp and other tag-based information. Similarly, any time a time stamp is shared or tracked across a consortium, other tag-based information may also be shared and tracked with the corresponding or similar time stamp. In another embodiment of the invention, different hosts may have different pairs of data that are shared (e.g., one host may always pair an email address with a username, and another host may always pair an email address with a time stamp). Any of the data items or types, including computer identifiers, time stamps, or other items discussed herein, may be paired.

When data is stored and tracked as a pair, fraud detection and validation may be improved. For example, if a pair of identifying data is stored, and then the same pair appears again, the device or individual can be identified with greater certainty as the same device or individual. Thus, consortia members may be able to share pairs of information to track a device or user.

The database table may enable the same user connecting to a different online business with the same user device to be tracked and registered in the consortium. The database table may also enable the same device connecting to different online businesses to be tracked and registered, regardless of user information. A great deal of additional information may be maintained such as last successful login date and time, last unsuccessful login date and time, total successful logins, total unsuccessful logins, tag-based time information, etc. as well as any relevant personal and non-personal information, to be discussed in greater detail below.

Based on gathered information, and any information generated by processing the gathered information, such as tag-based information, to be described in more detail, the likelihood of fraud being committed by a particular user with the user computer A1 may be determined and an appropriate action can be taken. Assuming the user computer A1 is granted access to the network, the user computer performs its electronic transaction. Based on information collected during the transaction, such as tag-based information, a likelihood of fraudulent activity for that transaction or device may be assessed.

If a fraudulent activity occurs during that electronic transaction, that information may also be conveyed to the authentication repository and may be stored by the authentication repository. Alternatively, if fraudulent activity occurs, the information may be conveyed to the other online businesses. In this manner, the one or more online businesses may share fraud information between each other selectively so that a fraud committed against one online business, i.e. online business A, can be logged into and tracked by the authentication repository in accordance with the invention. Alternatively, information about fraudulent activity can be tracked by the consortium of online businesses without analysis by an authentication repository. Thus, a user or user computer that has committed fraudulent activities can be tracked even when the user or user device logs into a different online business, i.e. online business B. Therefore, the fraudulent activities of a user or user computer can be tracked across the consortium.

Some implementations of using an authentication repository in a consortium may involve repositories capable of handling various tasks. An authentication repository may be one or more stand-alone computing resource, such as a server computer, with a database or storage system, although the functions of the authentication repository and the information storage may be distributed in any number of ways, such as in examples described previously. The authentication repository may include one or more processors, one or more persistent storage devices and a memory. The authentication repository may further include a database server/manager that may store the data in accordance with the invention. The structure and operation of the processor, persistent storage device and memory may be any computing device structure as known in the art. The memory may store a server operating system, and one or more administrator module that are executed by the processor to implement the fraud detection and prevention.

An administrator module may permit an administrator to interact with an online business. For example, an administrator may determine the threshold for enabling a user or device to interact with the online business if the user or device may be at risk for fraud. An administrator may also configure items of the system, adjust query items and update items. An administrator module may also process the data stored or received by the repository, such as to generate a device identifier. An administrator module may also analyze tag-based information received from a device. An administrator module may enable an administrator to generate a query of, given a particular user device, what users have used that network device or a query that asks, given a particular user, what network devices have been used by the particular user. The administrator may also configure a query that asks, given a particular user device, what other online businesses set this network device to associate users/devices a predetermined number of levels deep or given a particular user, what is that user's current status in the system. An administrator module may perform additional administrative functions such as generating reports from the fraud detection and prevention system and its database.

In some embodiments, hosts, such as online organizations or businesses, may be able to individually control their interactions with user devices. For example, hosts may set up any number of device and user status levels, and establish any number of behavior patterns, each of which might require a different action, such as notify a particular email address, page a particular number, deny access to the network, allow access but change the status of the device, etc. In some cases, each host can establish its own customized rules for every aspect of the present validation method. Because of this, the same circumstances that result in denied access for an end-user for one host may not result in denied access for another host.

Alternatively, an authentication repository may control a host's interaction with a user device. For example, an authentication repository may determine whether a user device is at risk for fraud and may deny the user device access to the consortium. In some cases, the authentication repository's determination for fraud risk may be uniform for all hosts.

Identifying information may be used for other applications in addition to fraud detection and prevention or network security. For example, gathered information may relate to a user rating, which may or may not relate to fraud. Such information can be shared across one or more online businesses in a consortium, to track a user or user computer across the consortium. In another example, gathered identity information may have applications in national security and law enforcement.

The information gathered in accordance with the invention may be customized for different user device types. For example, with a personal computer that connects to an online business, the information gathered may include an IP address or browser ID, tag-based information, and additional personal or non-personal information to identify the user device. With a cellular phone, it is typically possible to extract data from the cellular phone, such as its serial number, so that only non-personal information may be used to identify the cellular phone network device. For a PDA user device, it may be typically possible to put data/information, such as a tag, onto the PDA only so that the certain tag-based parameters only may be used to identify the PDA. Thus, depending on the user device, different information may be gathered. In accordance with the invention, information may also be gathered from a hardware device, such as a smart card or PCMCIA card, which may have its own unique identifier that may be used to uniquely identify the card, and tag-based information. Thus, information gathering in accordance with the invention may be implemented in a variety of different manners.

A user device's information, which may include risk for fraudulent activity, may be shared with various hosts at various times or manners. For example, transaction information may be shared with all hosts whenever a transaction occurs. In another example, transaction information may be shared with all the hosts at particular times, i.e. updating each host every ten minutes, or whatever time an individual host may wish to be updated. Alternatively, transaction information may be provided to a host upon request by the host. For instance, if the information is stored with an authentication repository, a host may choose to automatically update and access repository information whenever a transaction occurs between the host and a user device. In some cases, individual hosts may be able to determine when or how they receive or send shared information. In other cases, information sharing may be uniform across a consortium.

For any of the systems and methods described herein, a consortium may operate with tags that may be generated at or placed on a user device. One or more consortia may utilize tags when they have a program to be downloaded to a user device. For example, an online host and/or authentication repository may collect information about a user or user device with the use of cookies, local shared objects, flash objects, text parcels, or programs sent from a server to a client computer. A fraud detection consortium may be able to detect fraud by downloading a fraud detection program to a user device. A consortium may operate with tags that have certain device-related information by collecting information from a user device, generating information to be associated with the user device, and/or utilizing time stamp information from the user device.

In alternative embodiments of the invention, aspects of the systems and methods may be operated without a consortium within a single communication network. For example, any discussion relating to the tag-based identification, or use of timestamps may apply to a system utilizing an online organization server that need not share information with other online organizations. Any discussion herein of functions or components of an authentication repository may be performed or fulfilled by the online organization.

Figure 2:
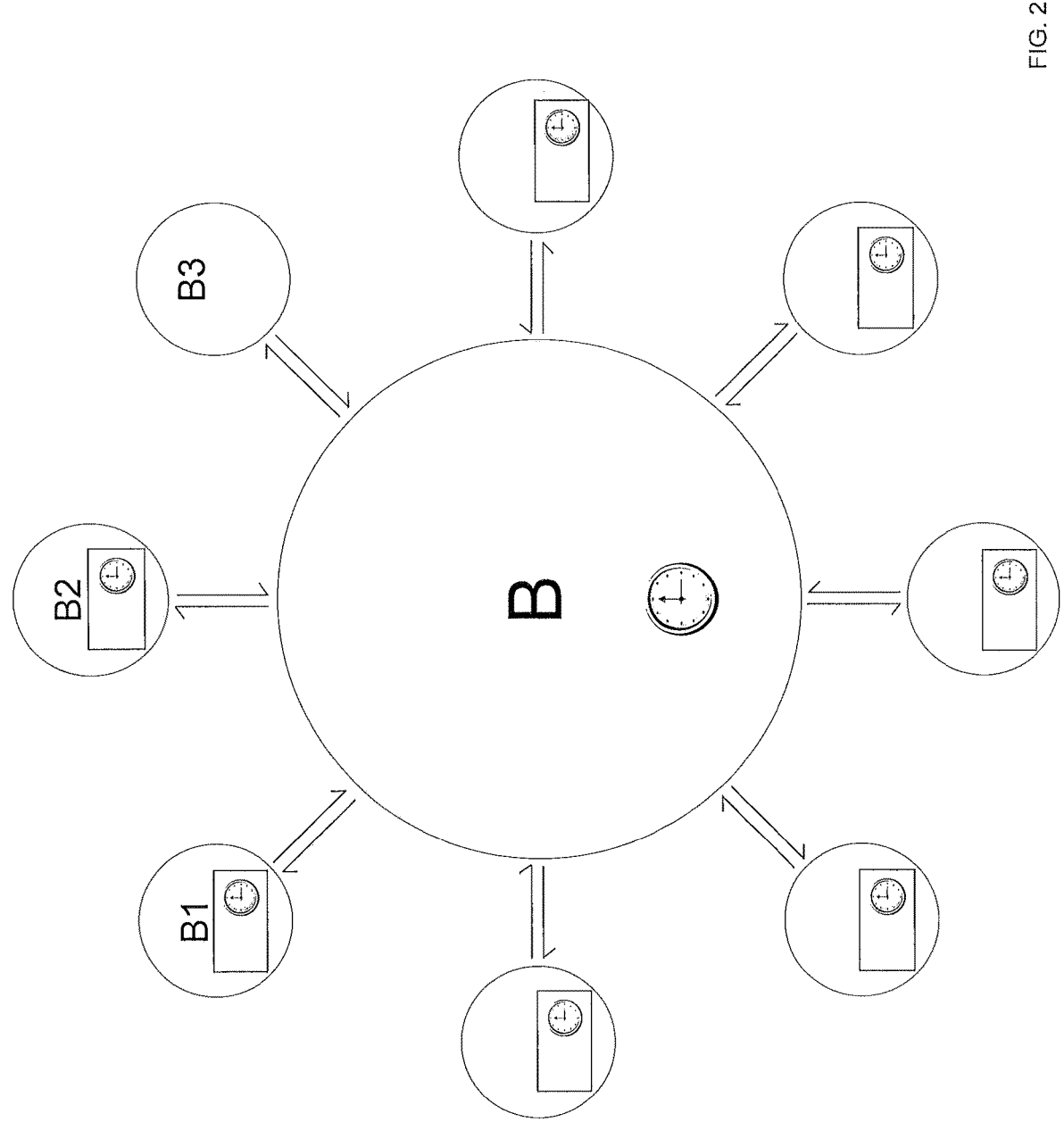
FIG. 2 is a diagram illustrating an example of an online institution connected to one or more user computer in accordance with the invention.

FIG. 2 is a diagram illustrating an example of an online institution connected to one or more user computers or devices in accordance with an embodiment of the invention. An online institution may gather information from a user computer. As discussed previously, the information may be gathered during an online transaction and may be used to identify a user and/or user device. In accordance with the invention, the consortium may utilize a user or device identifier, a tag, or any other data that may be used to identify a user or device. In some embodiments, a user may be identified based on a number of parameters. Such parameters may include settings or attributes of a user device. A tag may be provided and utilized to assist with identification, as discussed further below. Tag-based information may be utilized as part of, or in addition to, user or device-identifying parameters. The tag or information from the tag can be extracted and analyzed. See, e.g., U.S. Patent Publication No. 2009/0083184, which is hereby incorporated by reference in its entirety. Other information or parameters may also be used to assist in identifying a user and/or user device.

An online institution B may interact with one or more user computers B1, B2, B3, and so forth. User computers (e.g., B1 and B2) may have a tag residing in the memory of the user computers. In some instances (such as during an initial interaction with the online institution), a user computer (e.g., B3) may not have a tag. A tag may then be provided to or generated at the user computer B3, so that the user computer may also have a tag residing in memory. A tag may include a timestamp taken from a server (e.g., of online institution B or a central repository of a consortium), or taken from the user computer. In some embodiments, a time stamp may be embedded within the tag. Alternatively, a timestamp may be conveyed independently of the tag and/or may be somehow associated with a tag. For instance, a timestamp can be stored in a database independent of a tag.

In one example, a server may be interacting with a client. For example, the server may be provided for an online institution, an authentication repository, or any other part of a consortium that is not the client. The client may be a user computer. In some embodiments, the time stamp may be stored only on the server-side. The client may include a tag. In some implementations, the tag does not include the timestamp, or any data about the client or the interaction between the server and the client. Instead, the tag may have a random hash of information. The hash of information may be provided so that the same value can be provided to the tag without storing the data in the tag itself. In various embodiments, the tag on the client may or may not include timestamp information or other client-related data, and may or may not include some derivative (e.g., a hash) of the timestamp information or other client-related data.

In some instances, the time stamp and other client or interaction-related data may be stored on a database that may be external to the client. The database may or may not be associated with an online institution or authentication repository. In some instances, the data stored in the database may be associated with one or more tag string. The one or more tag string may correspond to a tag string stored on the client. The tag string on the client may be a random hash or generated string which may match the tag string associated with the data in the database. In some instances, the tag string may be unique to the client. Alternatively, it may have a high probability of uniqueness to the client. In some instances, the tag string may be stored in the database as well.

In some instances, an analysis may be provided for a client or interaction between client and server. This analysis may be used to determine a fraudulent transaction or to identify the client. The analysis may be based on timestamp information and/or other data collected about the client or interaction with the server. In some instances, based on a tag provided on the client memory, a corresponding tag may be accessed in an external database. The corresponding tag in the database may be associated with the timestamp and other data, which may be analyzed to detect fraud or identify the client.

Utilizing a tag on a user computer may exploit the tendencies of hackers and cyber criminals to remove or modify information that may track or otherwise draw attention to their actions. By monitoring certain activity or events based on when they occur or occurred, an online institution can draw associations from account activity from its users with potentially fraudulent transactions. Illustrated below are embodiments of the invention which employ time stamped device or computer tags that may be created by a server or user device and may reside in the memory of a physical device.

These tags may include information such as server time stamp information which relates to when they were created by the server or device. For instance, when the tag is created by a server, some embodiments of the invention may provide added security by encrypting the server time stamp information in the tag or the entire tag or cookie so it is less obvious or apparent to would be hackers or others. In particular, the computer tags provided in accordance with the invention may preferably exists as encrypted portions of cookies stored in the memory of devices often sent by servers to Web browsers.

It shall be understood that the time stamped computer tags herein may be used in combination with any other information, such as a customer ID number or identifier, a phone number, a drivers license number, a social security number, mailing address, ship to address, credit card number, email address, retail purchase location, and any other information captured during an online purchase or transaction, to identify and minimize transaction fraud and identity theft. For instance, in a typical embodiment, when a customer decides to purchase services, goods, or information from a website, the customer inputs additional, and more personal, identification information. This personal identification information may commonly include the customer's name, address, billing and shipping information, phone number, and/or e-mail address. Any other personal information, such as a customer's driver's license number, social security number, a personal identification number, retail purchase location, or any other information that may be captured as part of an online transaction could be used to identify and minimize transaction fraud and identity theft. The tag-based information may also be utilized in conjunction with non-personal information, such as settings or attributes of a customer device. Accordingly, the fraud detection systems and methods herein may utilize a time stamped computer tag alone or in combination with a device identifier or fingerprint, or other data that identifies a device in a relatively unique manner.

Figure 3:
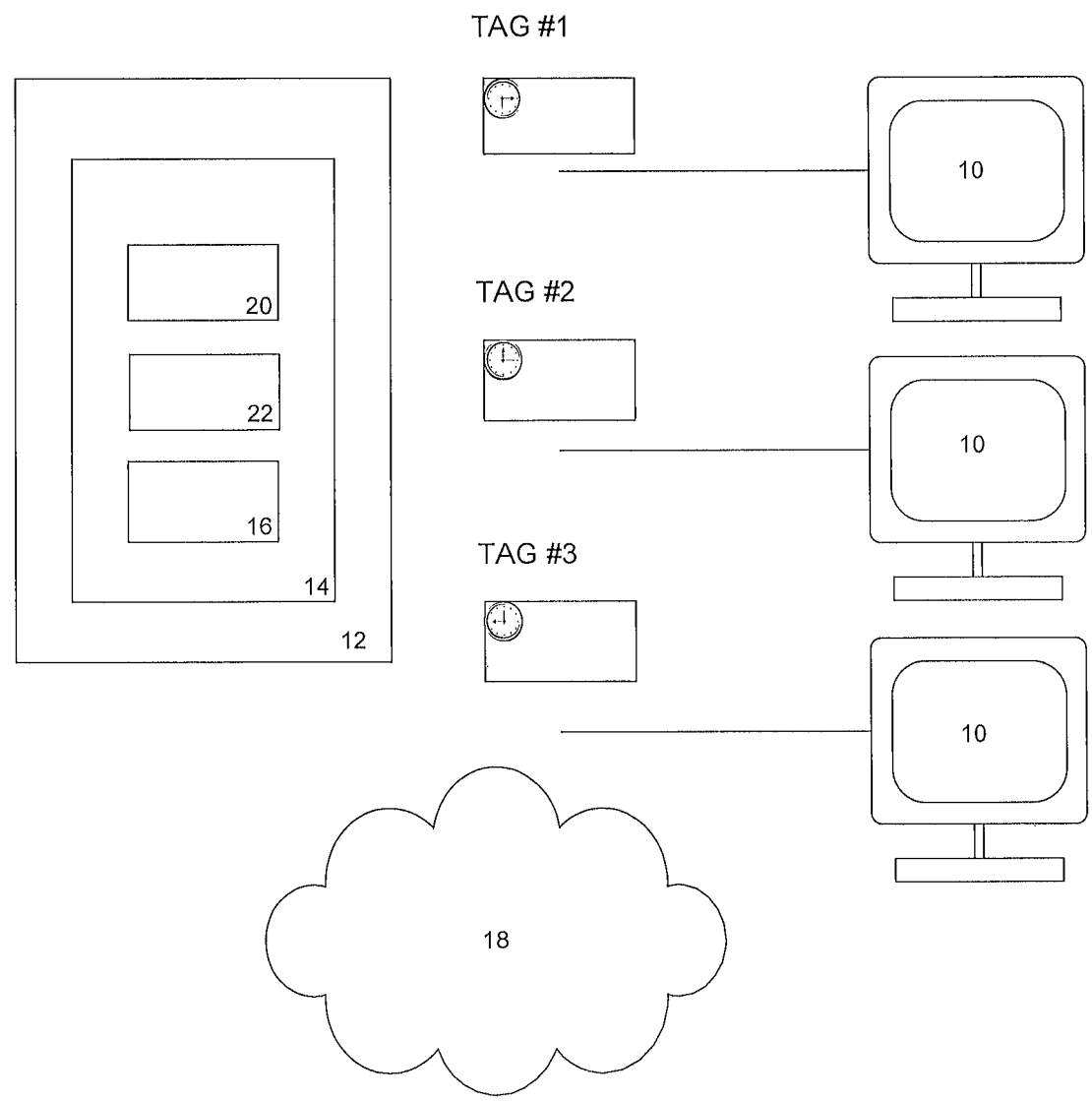
FIG. 3 is a diagram illustrating a computer-implemented electronic transaction network whereby network devices can access a computer network configured with a fraud detection system capable of analyzing time stamped tags associated with the network devices.

FIG. 3 is a diagram illustrating a computer-implemented electronic transaction system consisting of one or more network devices 10 connectable to a secure network 12. The network 12 may be operated by online businesses such as a financial institution which may offer online access to customers or other users. A fraud detection system 14 may be included as a part of or in communication with the network 12. For instance, the fraud detection system may be operated by the financial institution, or a third party (such as a consortium). A fraud detection server 16 and a time stamped computer tag database 22 may be included in the fraud detection system for issuing and storing time stamped computer tags in accordance with the invention. In addition, a computer tag analyzer 20 may be incorporated into the fraud detection system for analyzing information within tags such as server time stamp information. The fraud detection server 16, time stamped computer tag database 22, and/or computer tag analyzer 20 may reside on the financial institution system or a third party system. For example, they may reside at or be a part of the authentication repository.

The fraud detection system may be a standalone tool or function as part of an overall secure network operated by the financial institution or consortium. For example, a financial institution network may be accessible to network devices over a private network or over a communications network 18 such as the Internet (World Wide Web), a local area network (LAN), or any other network that is capable of communicating digital data, including a wireless or cellular network. When the fraud detection server 16 is connected to the communications network 18, the data between network devices 10 such as those used by banking customers, and the fraud detection server may be encrypted or travel over a virtual private network to ensure privacy and security. The network devices 10 may connect to a financial institution network as shown over the communications network 18 using well known data protocols such as HTTP, HTTPS and the like. A financial institution may provide a banking service such as online account access to each network device connected to it, and it may perform electronic transactions with network devices such as authorizing electronic payment or transfer of funds. Such electronic transactions are susceptible to fraud and each network device can be tagged in accordance with the invention to reduce the risk of fraud.

The fraud detection server 16 and computer tag analyzer 20 may receive and process account information and time stamped computer tag information from network devices 10 accessing the secure network 12. At least some of this information can be analyzed by the tag analyzer 20 to determine device related or server time stamp information indicating when the tag was issued by fraud detection server 16 or generated at or provided to a network device 10. These and other computer analyzers used in accordance with the invention herein include devices that analyze given data such as computer tag and cookie information. They can examine in detail the contents or structure of the given data and can try to find patterns and relationships between parts of the data or other information accessible by the fraud detection system. Such computer analyzers can be pieces of hardware and/or software programs running on one or more computers within the systems provided herein.

By analyzing the server time stamp information and comparing it to other known information about the particular account or resource accessible within the network in accordance with an embodiment of the invention, a fraud detection system may detect fraudulent activities across the electronic transaction network. In some instances, the fraud detection system may be comparing information and detecting fraudulent activities across a consortium. In particular, the fraud detection servers/systems may also uniquely track physical devices, register unique devices, track end-user logins, associate an end-user account with one or more specific devices, associate a device with one or more end-user accounts, and consider this information along with other computer tag information.

A preferable embodiment of the invention provides downloaded computer tags or cookies having encrypted server time stamps indicating when they were created and/or delivered to devices or generated at devices. The use of encrypted time stamps can be implemented with any of the embodiments of the invention described herein. For example, a cookie may be downloaded and stored in device memory. When viewing the contents of the cookie, which is often data in the form of a text file, it is preferable not to make apparent or obvious the existence of the time stamp in order to reduce the risk of cookie tampering. The time stamp information (7/31/2007 7:40 PM) may be encrypted by the fraud detection system according a selected encryption key or algorithm as known in the field. The seemingly irrelevant or indecipherable set of characters (ABC123GH XY45) may have no meaning other than for purposes of the fraud detection system. When the network device attempts to access an account within the secure network, the time stamped cookie may be delivered to the fraud detection system for analysis in accordance with the invention (see FIG. 3). The time stamp information may be decrypted by the fraud detection system and reviewed to determine when it was issued by the fraud detection server/system. With this time stamp information, the fraud detection analyzer and system may perform fraud prevention and detection functions in accordance with other aspects of the invention described herein.

For certain applications of the invention, a network device may request access to an electronic transaction network and a particular account for an online business such as e-Bay, Amazon.com, Bank of America, or other e-commerce company. To gain access to the account, complete a transaction, or access a particular part of the network, a user typically completes a log in and authentication procedure through the network device. When the network device has been previously tagged in accordance with the invention, the tag information along with its server time stamp information can be passed onto the fraud detection server and system for analysis. Preferably, at least the server time stamp information in the computer tag is encrypted by the fraud detection server so it is not obvious and readily manipulated. The encrypted time stamp information can be decrypted by the fraud detection server according to whatever encryption algorithms or methods are selected by and known only to or controlled by the online business or financial institution. Moreover, the computer tag may exist in the form of a cookie (e.g., a HTTP cookie, a Web cookie, a local shared object, a flash object) stored in the memory of the device along with other information commonly used to facilitate the exchange of information between a browser and web server. Encrypted time stamp information may be included with the other data usually found in the cookie text files such as an expiration date, a path, and domain name. When the network devices have not been tagged previously, they may be assigned a new computer tag by the fraud detection system in accordance with another embodiment the invention with a time stamp having a current issue date or time. A computer tag may be downloaded to a device from the fraud detection system to perform its "tagging." The system may subsequently request and determine if the device already has a time stamped computer tag from the server or will request a new time stamped computer tag if none exists for the network device.

Secure Networks

The secure networks accessed by network devices herein may be a combination of one or more Web-based server computer(s), such as web servers, an application server, a database server, etc., that are capable of communicating with network devices over a communications network, such as the Internet or a wireless network and is capable of downloading web pages or a software application to the network device. The secure network may comprise one or more processors, one or more persistent storage devices and memory. For the secure network to interact with the network devices, the network memory may store (and the processor(s) may run) a server operating system and a transaction processing software system to facilitate electronic transactions between the secure network and network devices.

In another preferable embodiment of the invention, a computer tag system may include server computers within a secure network that can also access databases with related user account history and log-in information. A computer tag may be created, delivered and stored on a client computer preferably as a small block of data or (persistent) cookie that facilitates exchanges with the secure network. The computer tag includes server time stamp information, preferably encrypted by the computer tag system before delivery to the client. In addition, the computer tag may be stored within a computer memory residing on the client computer that is analyzed when connected to the secure network. Furthermore, the computer tag can be delivered to the client computer through conventional methods and imbedded within a common software product like a web browser, or even imbedded in hardware or memory, any of which would be accessible when a connection to the network is established. A computer tag can also be delivered on demand, through a JavaScript, ActiveX control, or similar technology as a user connects to a secure network through a web browser. Alternatively, an application or script may be executed on a user browser, which may cause the generation of a computer tag at the client computer. Other user related information that is accessible to the secure network can be considered together with time stamped computer tag or cookie information provided herein.

Browsers and Cookies

When network devices are communicating with secure networks as described herein, they may run browser software or similar applications. Browsers may be configured to store into a computer memory time stamped computer tags provided in accordance with the invention. The computer tags herein may constitute an entire cookie or included as part of a cookie commonly used with Web browsers. In general, a cookie contains data or messages that facilitate online sessions between network device and (Web) servers or sites over the Internet. For example, a graphical user interface for a personal computer may permit the user to execute a browser application program such as Mozilla Firefox, Netscape Navigator and Microsoft Internet Explorer.

Any discussion herein of cookies may include flash objects (such as Adobe Flash local stored object), other local shared objects, or any form of client-side persistence and vice versa. In some implementations, the use of local shared objects may be advantageous since their user security controls are distinct from security controls for traditional cookies, so that local shared objects may be enabled when traditional cookies are not. In other embodiments, some web browsers support a script-based persistence mechanism that allows a page to store information locally for later retrieval. Internet Explorer, for example, supports persisting information in the browser's history, in favorites, in an XML store, or directly within a Web page saved to disk. With HTML 5 there may be a DOM Storage (localStorage) method, currently only supported by some browsers. For Internet Explorer 5+, there may be a userData method available through DHTML Behaviours. Another mechanism may rely on browsers normally caching (holding in memory instead of reloading) JavaScript programs used in web pages. As an example, a page may contain a link such as <script type="text/javascript" src="example.js">. The first time this page is loaded, the program example.js may be loaded as well. At this point, the program can remain cached and need not be reloaded the second time the page is visited. As a result, if this program contains a statement such as id=123abc (global variable), this identifier may remain valid and can be exploited by other JavaScript code the next times the page is loaded, or another page linking the same program is loaded. Thus, any discussion herein of cookies or tags may be applied to any mechanisms known in the art that may provide some sort of persistence of data to a client-side device.

The browser options may be selected to enable or allow the download of cookies or computer tags with server time stamp information from fraud detection systems described herein. The information or data within cookies can be modified in accordance with a preferable embodiment of the invention with time stamp information while still allowing them to fulfill their common purpose of identifying users and preparing customized or personalized web pages. One of the benefits of provided by this aspect of the invention is the ability to exploit a relatively small amount of data in a manner that can largely escape the attention of a hacker. Server time stamp information may be a piece of information that can be used as a marker for fraudulent activity when pieced together with other account information as described herein. When encrypted/decrypted, this information may become even less noticeable or of concern to hackers yet exploited and recognized in particular by fraud detection systems herein.

During online sessions between user devices and a Web site, cookies can be sent back to servers, such as an online organization server or an authentication repository, when logging on or when pages are requested. When a user enters a Web site that uses cookies, certain information about that person such as name and preferences can be requested and retained. This information can be packaged into a cookie along with server time/date (time stamp) information according to a server computer clock that will be sent back to the Web browser and stored for future use. Persistent or permanent cookies are preferably selected herein and stored in a device memory (hard drive) between sessions and logins until it expires at a certain expiration date or is deleted. The next time the user logs on or requests a page or information from the Web site, the browser can send the previously issued cookie along with its package information and time stamp information in accordance with the invention.

While the server can use the cookie information to present customized web pages for the user, a fraud detection system within a site network can also detect the possibility of fraud in accordance with the invention. The time stamp information can be analyzed by the fraud detection system provided herein to determine if the cookie was recently issued. The time stamp information may be analyzed at an online organization level, or may be compared with information provided by other online organizations to be shared at a consortium level.

For many authorized users who would not ordinarily delete computer cookies or tags, such time stamp information would not be particularly recent (e.g., weeks, months old). Meanwhile, fraudsters or hackers will often delete cookies from their computers before attacking web servers and computer systems. In some instances, recently issued cookies may be only a few minutes or hours old in comparison to days or weeks. So hacker accesses to web servers will usually result in having either no cookies, in which case they can be immediately issued new time stamped cookies as described herein, or recently issued cookies as determined by a fraud detection system or methods herein. The fraud detection system can consider the frequency and number of recently issued cookies in combination with other patterns or parameters relied upon in detecting potential fraud as designated or relied upon by the online business.

Cookie Building and Storage

The fraud detection server may initiate the storage of a time stamped cookie (a.k.a. time-encrypted cookie) on a user computer system in a variety of ways. For example, to build and store the cookie, the fraud detection server may generate an identifier to a cookie builder which may correspond to a particular user or not (random or arbitrary). The cookie builder may include the user identifier into the cookie and may add other status information to the cookie, plus a server time stamp. The identifier and the other information may be processed by a cookie signer optionally, which may sign the cookie using conventional cryptographic techniques, such as by hashing the identifier, and optionally the other information, using a secret hash key to produce a hash result referred to herein as the cookie signature. The cookie signer may provide the cookie signature, identifier and time stamp information (collectively referred to as the cookie) to a cookie encryptor, which preferably encrypts the cookie using conventional encryption techniques, such as using the public key of a public key/private key pair or using a symmetric key. The cookie encryptor may then direct the cookie to a user browser for storage of the encrypted cookie in cookie storage location on the user computer or device via various communication and network interfaces, and optionally over an SSL connection.

It shall be understood that the storage of the cookies provided herein may be accomplished in conventional memory or disk storage and may be a portion (cookie folder) thereof used for the storage of cookies. Alternatively, the memory may be another part of the user computer system or may reside in a removable device such as a smart card, USB memory token a portable memory device that interfaces to a personal computer through a USB port, such as the USB Memory Key or the like. Although a cookie is selected in this described embodiment, other types of encrypted data or files, certificates or other similar data structures may be used in accordance with the concepts of the invention.

Cookie Analysis

A user may request a page from a Web site through a browser during a session with an online business such as a bank or financial institution. The browser may send a request to a server within a secure network via communication interfaces and network. The communication interfaces can pass the request to a Web application running within the secure network, which can be conventional application programs modified for various applications such as online banking. The Web application may authenticate the user and facilitate various kinds of transactions.

During user authentication or any other time during a session, the fraud detection systems herein may read the encrypted cookie provided by the browser from a cookie storage area. The encrypted cookie may be passed to a fraud detection server and cookie analyzer (see FIG. 3), which can be configured with a cookie decryptor to decrypt the encrypted cookie, and then separate or consider the time stamp information aside from the remainder of the cookie for analysis such as determining how old is the cookie or when it was created.

Additional Fraud Analysis

In another embodiment of the invention, a secure network administrator or fraud analyst can actively screen information for various accounts. These accounts may be identified by the fraud detection system according to time stamped computer tags sharing the same or substantially the same creation date/time. Suspicious accounts may be identified for further investigation by fraud analysts. For example, a number of accounts with stated addresses may be logged in from the same network device with all newly created computer tags—this may be flagged or identified as suspicious. The fraud detection and preventing systems herein may also automatically or manually generate information related to collected time stamped computer tag information to identify spikes or large numbers of computer tags issued or created with a particular server creation date/time.

Furthermore, the invention takes into consideration that many attackers or hackers are likely to access relatively large numbers of different accounts within a particular network and within a particular time frame. Large or massive scale hacking may be performed quickly with automated computers and programs. By comparing accesses to multiple accounts by a device bearing the same or near same computer tag and recent time stamp information, it may be possible to detect patterns of unauthorized access. It shall be understood that the invention may be applied with other systems and methods which authenticate or uniquely identify devices according to a device fingerprint or identifier including but not limited to those described in U.S. Patent Publication Number 2007/0239606, U.S. Patent Publication Number 2010/0004965, U.S. Patent Publication Number 2009/0083184, U.S. Patent Publication Number 2006/0048211 (Pierson et al.) and U.S. Pat. No. 7,100,049 (Gasparini et al.) which are incorporated by reference in their entirety herein.

Additional information about users may be maintained and also used for further fraud analysis by the systems and methods herein such as last successful login date and time, last unsuccessful login date and time, total successful logins, total unsuccessful logins, etc.

FIG. 4 is a computer tag information table listing corresponding time stamps for a set of exemplary tags. Various tag and time stamp tables provided in accordance with this aspect of the invention can be stored in databases and analyzed by fraud detection systems provided herein (see FIG. 3). A tag number (TAG #1) can be any arrangement of numbers and/or characters that are issued by a fraud detection server for devices previously without tags. The time stamp information of a time-encrypted tag can be set to a selected computer clock, preferably to a server computer clock for one or more of the fraud detection servers within a fraud detection system. Alternatively, the time-encrypted tag can be set to a user computer clock. Any format indicating time can be applied to the invention that includes date and/or time information. For example, when time stamps include date information, the month/day/year (7/12/07) format can be used as illustrated or other formats can be used (7/12/2007, 12/7/07, Jul. 12, 2007). Time stamps provided here can also include hour and minute information in various formats too (4:25 pm, 4:25:55, 16:25 pm PDT). It shall be understood that the various kinds of time stamp information described herein can be stored, modified and encrypted/decrypted as known by those skilled in the art.

In some embodiments, a time-encrypted tag may also include a time stamp taken from user computer. For example, time stamps taken from computer clocks of user computers may have different formats. As discussed previously, a date time stamp may have different formats such as 1/01/01; 01/01/2001; Jan. 1, 2001; 1 Jan. 2001, and so forth. Similarly, hour and minute time stamps may have different formats such as 1:00 PM, 1:00:00 PM, 13:00:00, 13:00 PST, 18:00:00 UTC, and so forth. The format of a time stamp may be utilized as a parameter when comparing user computers to detect fraud. For example, if purportedly the same user computer is being utilized in multiple transactions, but different time stamp formats are utilized, this may be cause for suspicion. User computer time stamp formats may be a parameter that may be tracked for user computers across a consortium.

A preferable embodiment of the invention provides a fraud detection system that can monitor suspected fraudulent activity by utilizing one or more time stamp databases stored in a computer readable memory. A fraud detection server (whether the fraud detection server may be a financial institution server or a third party consortium server) can access and update a time stamp database with information obtained from computer tags retrieved from devices trying to access a secure network (see FIG. 3). The time stamped computer tags on devices may be analyzed by the fraud detection system to indicate when it was generated and if it was recently issued. Based on the time stamp information retrieved from the network device, by itself or in combination with other available information from an online business, the likelihood of fraud being committed by the particular end-user with the network device is determined so that appropriate action may be taken.

For example, when a (threshold) number of accounts are accessed within a predetermined period of time all having recently issued computer tags within a particular period of time (e.g., 1 hour), some or all of these accounts may be flagged for potential fraud and further investigation. In other instances where there may be suspected fraud, a recently issued tag may be received from a device trying to access an account that had not been logged into for a long time. Unless expired or intentionally deleted by a user for a valid purpose, computer tags or cookies are not deleted or disabled from a device in order to permit interaction with most Internet Web sites and servers. Other conditions or possible indicators of unauthorized access include a device trying to access a relatively older account that was created long time ago. It has been observed that many attackers or hackers are likely to remove computer tags such as cookies stored on their computer or device before attempting to access numerous accounts within a secure network. By deleting the cookie or computer tag and/or by accessing a relatively large number of accounts to an online business or financial institution, a significant number of new computer tags may be generated and flagged for possible fraud in accordance with the invention.

In some embodiments, a database may also include tag-based time stamp information that may relate to the time-format provided by the device rather than a server. As discussed previously, different devices may provide time stamps with different formats. In some embodiments, a tag of a device may be encrypted with a time provided from the device. The time-encrypted tag may utilize an algorithm, hash function, or any other method that may encrypt the time stamp. In some embodiments, when the encryption is decrypted, the various time stamp formats may be preserved and provided to the database. The database may be analyzed to determine if time stamp formats vary from device to device. Time stamp formats may be one of the parameters stored in the database and analyzed.

In an alternative embodiment of the invention, a network device may be initially granted access to the network and an online account to perform an electronic transaction. If fraudulent activity occurs during this electronic transaction, the time stamp information associated with the network device may be also stored in a database within the fraud detection system for possibly detecting other instances of fraud with network devices having similarly dated computer tags. In this manner, the online business can utilize such fraud information selectively so that a fraud committed in one account is logged into and tracked by the fraud detection system. In some instances, a plurality of online businesses within a consortium can utilize the fraud information, so that fraud committed at one account is logged and tracked by the fraud detection system across the entire consortium. Accordingly, a user or network device that has committed fraudulent activities may be tracked even when the network device is used to log into a different account, or when the network device is accessing a different online business.

Furthermore, the fraud detection server/system and computer tag systems herein may comprise administrative components including a web admin module or a reports module. The web admin module may permit administrator level management of the secure network to perform various functions such as to tuning or setting its fraud tolerance levels, inspecting and changing individual customers fraud status, and checking relationships and activity of customers to one another. For example, a financial institution may be able to detect an influx or sudden spike of newly created computer tags associated for the accounts for its online customers within a particular period of time, or a consortium may be able to detect the influx or sudden spike of newly created computer tags across the consortium. A reports module may also help a business keep apprised of existing accounts suspected of fraud as well as their historical information.

Fraud Detection Servers and Modules

The fraud detection servers herein may be a stand-alone computing device, such as a server computer, although its functions may be distributed among various devices as described above. The fraud server may include one or more processors and persistent storage devices and memory as described above. The fraud server may further include a database server/manager that stores the time stamped computer tag in accordance with the invention. A fraud detection server memory may store a server operating system, an a variety of software modules including an administrator software module, a fraud detector software module, a reports software module and a tagger software module wherein each module comprises a plurality of instructions (and associated data) that are executed by the processor to implement the fraud detection and preventing system and methods herein.

The administrator module, in a preferable embodiment, may generate administrator web pages that determine how a user can interact with the system and configuring the system. For example, the administrator web pages may permit modification of how the fraud detection server and analyzers process time stamped computer tag information herein.

The reports software module can provides reports with information from the fraud detection and prevention system and its databases. For example, the system may generate a report showing the daily change report such as a fraud report listing the network devices that possessed similar computer tags or cookies created at or around the same date/time, their status, or a shared computer report listing all of the network devices that have multiple computer tags or cookies associated with them.

The fraud detector software module may contain the instructions and logic to process analyzed data relating to the network devices and users. This program may determine relationships and possible correlations between network devices and the time stamped computer tags provided herein.

Figure 5:
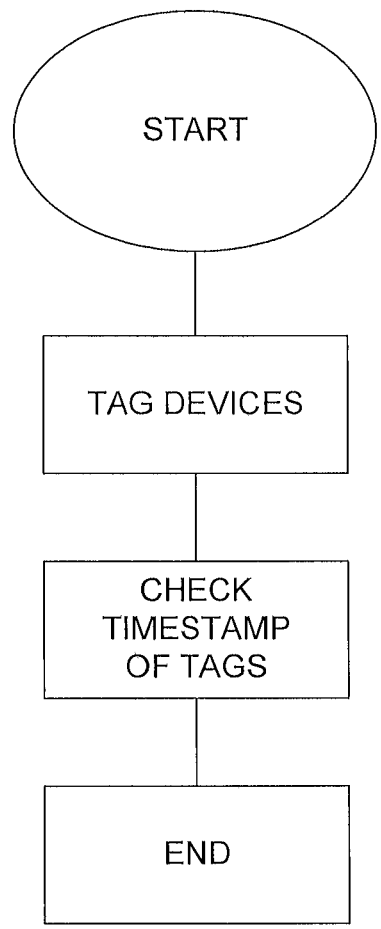
FIG. 5 is a flowchart describing computer tagging and fraud detection methods provided in accordance with the invention.

Another aspect of the invention provides protocols and methods for detecting possible fraud by analyzing time stamped computer tags. As illustrated in FIG. 5, computer tagging and fraud detection methods are provided herein. For example, when a user attempts to log on to a Web site server, the fraud detection system/analyzer may be alerted to check or analyze a time stamped computer tag retrieved from the user device. If the device does not have one already, then a new time stamped computer tag can be generated by the fraud detection server as described herein. New devices can be tagged herein by a variety of methods including the downloading of time stamped cookies containing encrypted creation time/date information stored in device memory. If the device already has a time stamped computer tag, it can be analyzed so that time stamp information can be retrieved. A decryption step may be performed by a computer tag analyzer when time stamp information is encrypted according to methods selected ahead of time by the fraud detection system.

Other embodiments of the invention described below provide alternative methods of tagging network devices in accordance with the invention. Such methods can determine how old is a computer tag or when it was created according to a server time stamp. This may be performed every time a device connects to a secure network, and may also be performed at various points and intervals throughout an online session periodically. When a network device attempts to connect to a network for the very first time, these methods ensure that the device is tagged with computer tag such as a downloaded cookie containing a creation date/time.

Similarly, the invention may provide methods of tagging network devices, which take a time stamp from the network device. This time stamp, in addition to providing time information about the network device, may also provide information about the time stamp format of the network device. In some instances, a time stamp may be taken from the user device and provided as part of the tag information, every time the network device connects to a secure network, or may be performed at various points and intervals throughout an online session. This may determine whether the time provided by time stamp changes in a predictable or erratic manner, or whether the time stamp format remains consistent or varies from session to session, or within a session.

In preferable embodiments, these methods can unobtrusively store encrypted tags or at least the time stamped portions thereof. This aspect of the invention includes other methods of utilizing the features and functionality provided by the fraud detection and prevention systems described above.

In accordance with some embodiments of the invention, a device identifier, such as a customer computer identifier, may be generated for use in detecting fraud in connection with online commercial transactions. The customer computer identifier may be used to identify any user device. For instance, a fraud detection server may receive customer personal information, such as name, address, phone number, etc. A web server may also receive non-personal information from the customer such as IP address and Browser ID. The web server may be able to receive tag-based information from the customer computer. The web server may capture the local time and the time zone at the customer computer. Any of the data collected as fields, or may be hashed or encrypted of the data, a combination thereof, or stored as any form of data derived from the collected data. Any one or more of these steps may be used in combination with each other and in a different order of operation depending on selected applications. It should be further understood that processes in accordance with this embodiment of the invention may provide tag-based information as described elsewhere herein and also used together with other aspects of the invention.

In one implementation of the invention, a particular subset of selected parameters or fields, including tag-based information such as time stamp information, can combined or analyzed to detect fraud or track a device. These selected parameters are not meant to be limiting and other information or fraud parameters described herein or otherwise known to those of ordinary skill may be analyzed.

An online merchant or a consortium may include, remove, and weigh each parameter. For example, the merchant may choose to only use the server time stamp from a computer tag. In another example, the server time stamp may be analyzed with reference to other parameters which may help in identifying a computer. Accordingly, the merchant may set a matching parameter to fit a level of comparison between a first and subsequent transaction. In some instances, some parameters may slightly vary over time. The merchant may set the matching parameter to include a range of parameter values, instead of an exact match. This way, even if some parameter values vary slightly, the matching parameter can still identify the subsequent transaction as a potential fraudulent one based on other information within the computer identifier.

In a consortium with one or more online merchants, each merchant may be able to autonomously choose how to weigh each parameter of a computer identifier. Alternatively, in a consortium, a central repository may determine the weight of each computer identifier parameter for each of the online merchants.

Accordingly, once a merchant determines that a first fraudulent transaction may have been made, the merchant can flag the device identifier, or parameters associated with the device. Then, a matching parameter can be used to identify a subsequent transaction which reveals a user or device with an identical set of parameters. The matching is typically implemented by software, for example, on a hard disk, floppy disk, or other computer-readable medium. The subsequent transaction may occur with the same merchant or another merchant in the consortium.

In some embodiments, once a merchant web server determines the set of parameters for a first transaction and a subsequent transaction, a comparison can be made as between the two sets of parameters. The sets of parameters may include tag-based information. The two transactions may or may not be with the same merchant. After the comparison has been made, a computer implemented software program may continue to execute the next step of assigning a matching parameter value to the pair of transactions based on the similarities between the first and subsequent transactions. The website server running the comparison program may inform a merchant of a matching parameter value, which in turn may provide information suggesting to cancel or confirm the transaction, inform the costumer status order, demand more information, or the like. The merchant may then choose its desired course of action. It shall be understood that the memory of a merchant web server may contain software programs with instructions to perform any combination of these steps to provide these and any other methods described herein in accordance with the invention.

Such a method may be used for a standalone merchant with customer computers or devices. Similarly, the method may be applied to one or more consortia. Either a merchant web server or an authentication repository may be determining the computer identifier and either may assign a matching parameter value. For example, the authentication repository may inform a merchant of a value and suggest confirming or denying the transaction. In some cases, the repository may determine a merchant's course of action. In one or more consortia, the matching parameter may be determined from information gathered from any transactions with any organizations in the consortia. Also, information gathered or processed by a merchant may be shared with other merchants in the consortia.

In some embodiments an online host may standardize the information gathered from one or more user devices. Furthermore, in some embodiments of the invention, an authentication repository may standardize the information gathered from one or more hosts. In other embodiments, the online hosts of a consortium may standardize the information gathered from user devices in the same manner, such that they are already standardized with respect to one another. In some embodiments, the information may not be standardized, or different in information formats may be noted and utilized as a parameter to detect fraud.

For example, a time-encrypted tag may include a time stamp based on a computer clock provided by the user device. The time stamp from the user device may have a particular format, which may vary from user device to user device. The differences within the time stamp formats may be analyzed or tracked as a parameter to detect fraud. In some instances, the differences within the time stamp format, may also be standardized in order to compare the content of the time stamp across different formats. Thus, a time stamp format may be both standardized and/or not standardized for various parameters, and the format and/or content of a time stamp may be utilized.

Similarly, when one or more consortia are in communication with one another, the information gathered from user devices may be normalized. This may occur at the host level, or at the authentication repository level, or any other level. For example, when multiple authentication repositories are communicating with one another, the repositories may normalize the collected data in a consortium, and when communicating with another authentication repository, may convert the data from another authentication repository into a standard format to share with the hosts of its own consortium. Any data formatting system or method may be set up or developed in order to accommodate the sharing of information from multiple sources across one or more consortia.

Figure 7:
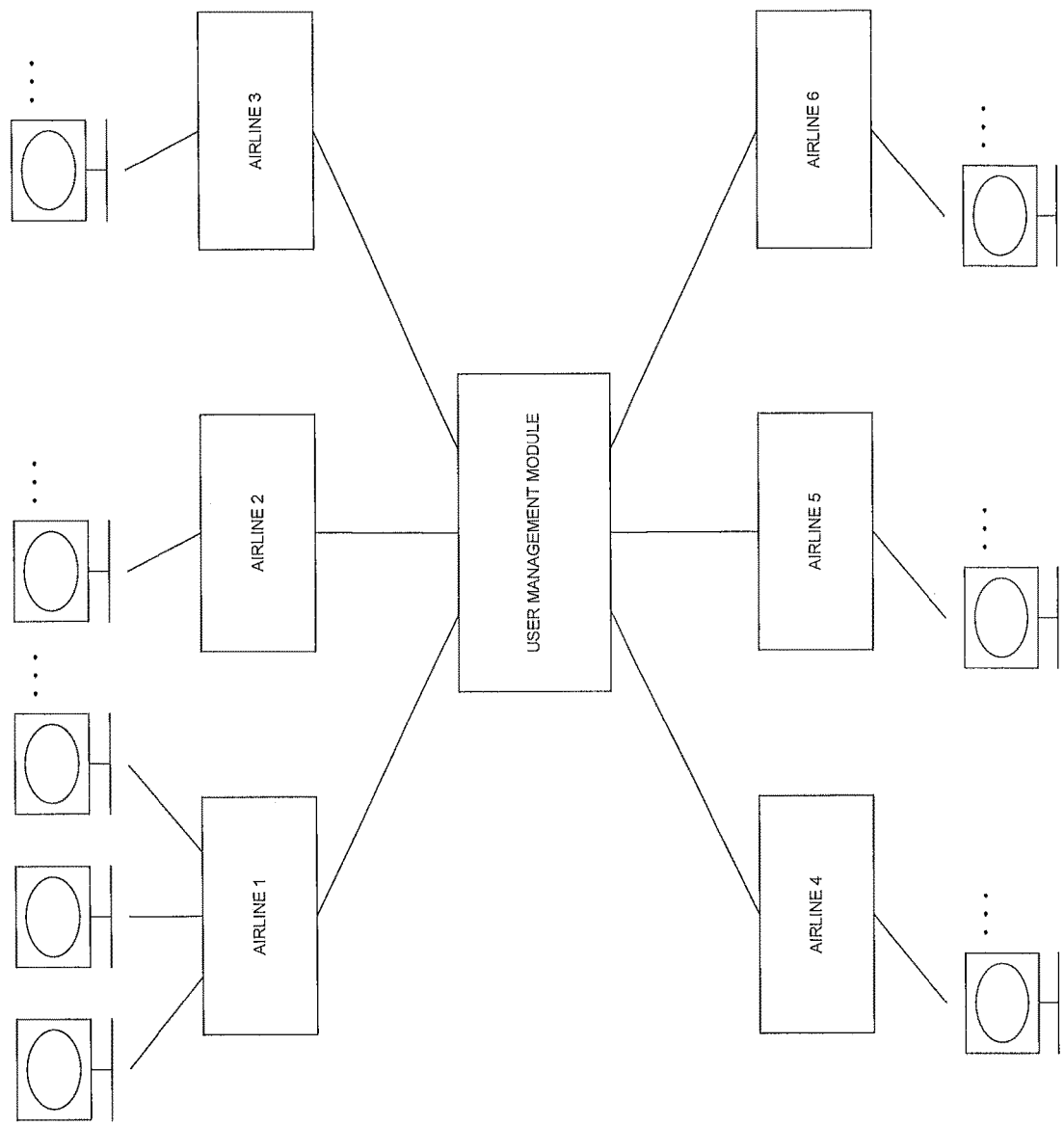
FIG. 7 illustrates an implementation of sharing data within a user group.

FIG. 7 shows an exemplary implementation of the consortium. A plurality of organizations, such as Airlines 1-6 may be part of a user group, where the members of the user group may agree to share selected data. For example, each of the airlines of the user group may agree to share fraud-related data. Each airline of the group may interact with one or more device. For example, user computers may access a server of an airline. In some embodiments, the same user computers may interact with multiple airlines. Any description herein relating to an airline (or figures referring to airlines) may also be interchangeable with a banking organization, any other financial institution, a merchant, or any other organization.

The user group may also include a user management module. The user management module may allow members of the group (such as the airlines) to agree to share selected fraud related data. In some embodiments, the user management module may facilitate the actual sharing of data. For example, the user management module may store some of the fraud related data. Alternatively, the user management module may assist with the transfer of data from one airline's server to another airline's server. In other embodiments, it may assist with running the user group without actually implementing the data sharing.

The airlines may be sharing any data with one another. For example, the airlines may be sharing computer identifiers (CI) and/or computer tags with one another. A CI can consist of one or more personal and non-personal parameters. An example of a non-personal parameter may be a delta of time parameter. The airlines may share any other personal or non-personal data, which may include name, credit card number, email address, home address, or any other fraud-related data as discussed herein. Similarly, a computer tag may include time stamp information, and any other information, which may include personal and non-personal parameters. The time stamp information may relate to an action relating to the computer tag (e.g., generation of the computer tag) or an online transaction (e.g., when a user device is accessed).

A user management module may obtain data elements that may be shared across the user group. The shared data elements may include personal information, such as email address, billing address, name, etc., as well as non-personal information, such as time stamp information or PCPrint information, which may be extracted from a device and be based on a composite of the information extracted from the device. In some embodiments a PCPrint may be a hash string based on information collected from the device. In some embodiments, a time stamp may be obtained separately or in addition to the PCPrint. The combination of the PCPrint and time stamp may or may not be hashed.

Preferably, data collected to form a computer identifier, such as a PCPrint may be read or extracted from a device. Data may be read from the device from a computer tag which may be stored on the device.

Figure 6:
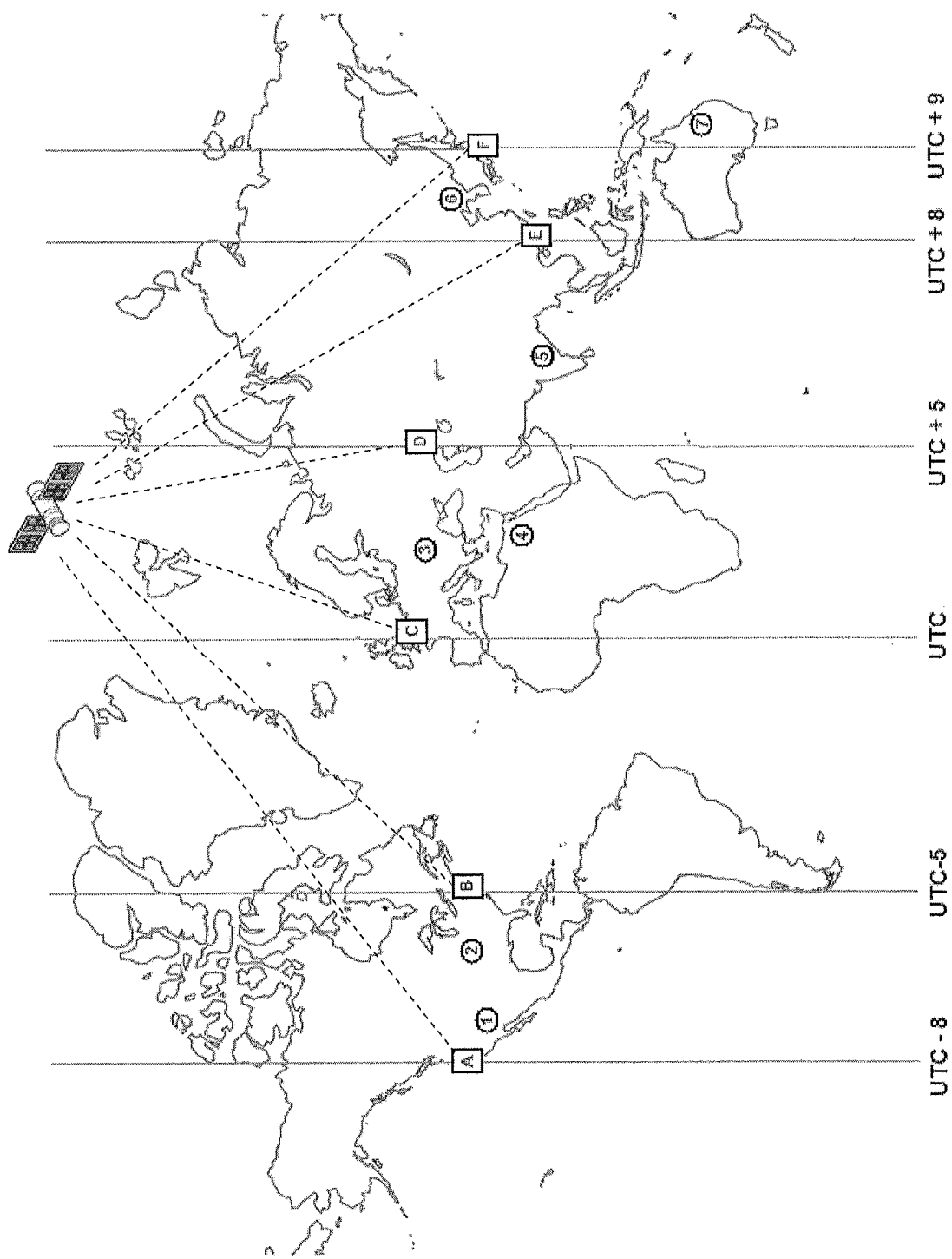
FIG. 6 illustrates an implementation of the consortium in a global setting.

FIG. 6 illustrates an implementation of the consortium in a global setting. When collecting information about a user device in a consortium, where a user device may interact with one or more online hosts, accommodations may be made to account for different time zones provided by a user device and multiple hosts. In some instances, the time on the various hosts may be synchronized to a consortium reference time. Alternatively, the differences in time between the various hosts may be tracked. In some embodiments, the differences in time between various devices may also be tracked.

As discussed previously, a consortium time may be any reference time, which in some cases may be the UTC time. Also, any other reference time may be used, including an arbitrary time, or an authentication repository clock time, which may be the local time according to an authentication repository clock or which may be synchronized to another time, such as UTC time.

In some embodiments, one or more of the parameters provided for fraud detection or other application may include a time component. For example, a server time stamp from a computer tag may reflect the time setting at the server that generated or delivered the time stamp. In some embodiments, to gain a global sense of when a tag was created, the time stamp may be encrypted as a consortium reference time, or the difference between the time stamp and a consortium reference time may be tracked. Thus, even if a tag were created in different time zones, such as at server C in UTC time server B in UTC-5 time, the server time stamps for the tags will reflect the actual difference in time when they were created, rather than just a local time reflecting when they were created. For example, if a first tag is created at 8:00 AM UTC time, which is server C local time, and a second tag were created at 3:05 AM at server B's local time, they were in actuality created 5 minutes apart, and the time stamp may be standardized to a consortium reference time, such as UTC time, in which case the time stamp for the first tag may say 8:00 AM, and the time stamp for the second tag may say 8:05 AM.

Preferably, the local server clocks may be synchronized so that the time stamps from servers in different time zones may automatically be synchronized to a reference time. Alternatively, the difference between local server clocks may be tracked so that time stamps taken from servers in different time zones with different local clock times can be synchronized with a reference time by incorporating the difference between the local server clock time and reference time. For example, if the local server clock states that the time is 3:05 AM and it is known that the local server clock is 5 hours behind the reference time, the time stamp may be synchronized to the reference time, at 8:05 AM.

The same synchronization techniques may be applied to time stamps taken from a user device. The difference between a user device time and a reference time can be tracked. Similarly, multiple steps may be utilized to synchronize a user device. For instance, the difference between a user device and server may be tracked, as well as the difference between a server time and a reference time, in order to set a time stamp to the reference time.

By somehow standardizing or tracking the relative times of the server or device time stamps for a tag, a fraud detection system may more accurately assess whether there was a spike in tag generation on a global scale.

Also, by standardizing or tracking the relative times for a device time stamp for a tag, a fraud detection system can analyze the device time stamp content for suspicious activity across a global consortium.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system comprising:
a network interface configured to communicate with a plurality of network service devices comprising a first network service device associated with a first institution and a second network service device associated with a second institution;
at least one processor in communication with a data store that is configured to store computer-executable instructions that, when executed, cause the at least one processor to perform the following during a first online transaction of a first customer computing device with the first institution:
determine a preconfigured risk threshold associated with the first online transaction;
access, from the first customer computing device, a first transaction tag comprising an encrypted first timestamp having a first timestamp format associated with the first customer computing device, the encrypted first timestamp associated with the first online transaction and a first time during the first online transaction;
decrypt the first transaction tag and determine the first timestamp format associated with the first customer computing device;
access, from the first customer computing device or a second computing device, a second transaction tag comprising an encrypted second timestamp having a second timestamp format, the encrypted second timestamp associated with a second online transaction and a second time during the second online transaction, the first online transaction subsequent to the second online transaction;
decrypt the second transaction tag and determine the second timestamp format;
compare the first timestamp format and the second timestamp format;

based at least in part on the comparison, determine that the first timestamp format varies from the second timestamp format and determine that the first transaction tag and the second transaction tag were created within a predetermined time interval;

based at least in part on the determination that the first timestamp format varies from the second timestamp format and the determination that the first transaction tag and the second transaction tag were created within the predetermined time interval, associate an increased risk of fraud with the first online transaction, wherein the increased risk of fraud is indicative of a likelihood that the second transaction tag is not associated with the first customer computing device;

compare the increased risk of fraud with the preconfigured risk threshold;

based on the comparison of the increased risk of fraud with the preconfigured risk threshold, generate a risk data packet comprising (a) a device identifier associated with the first customer computing device, and (b) an electronic indication of the increased risk of fraud associated with the first online transaction;

transmit the risk data packet to the first network service device; and facilitate transmission of the risk data packet from the first network service device to the second network service device.

2. The system of claim 1, wherein:
the first time is a time of creation of the first transaction tag; and
the second time is a time of creation of the second transaction tag.

3. The system of claim 1, wherein:
the increased risk of fraud is further associated with the first transaction tag and the second transaction tag; and
the risk data packet further comprises an electronic indication of the increased risk of fraud associated with the first transaction tag and the second transaction tag.

4. The system of claim 1, wherein the first transaction tag comprises at least one of following customer personal information: name, address, billing or shipping information, phone number, driver license number, email address, or credit card number.

5. The system of claim 1, wherein the first transaction tag comprises at least one of following non-personal information: IP address or browser ID, device settings, delta-of-time parameter.

6. The system of claim 1, wherein the computer-executable instructions further cause the processor to:
based at least in part on the comparison between the first timestamp format and the second timestamp format, determine that the first timestamp format remains consistent during the first and second online transactions.

7. The system of claim 6, wherein the computer executable instructions further cause the processor to:
during a third online transaction subsequent to the first online transaction:
determine a second preconfigured risk threshold associated with the third online transaction;
access a third transaction tag comprising an encrypted third timestamp having a third timestamp format, the encrypted third timestamp associated with the third online transaction, wherein the third transaction tag is generated at a third time during the third online transaction;
decrypt the third transaction tag and determine the third timestamp format;
compare the third timestamp format and the first timestamp format;
based at least in part on the comparison between the third timestamp format and the first timestamp format, determine that the third timestamp format varies from the first timestamp format and determine that the first transaction tag and the third transaction tag were created within the predetermined time interval;
based at least in part on the determination that the third timestamp format varies from the first timestamp format and the determination that the first transaction tag and the third transaction tag were created within the predetermined time interval, associate an increased risk of fraud with the third online transaction, wherein the increased risk of fraud associated with the third online transaction is indicative of a likelihood that the third transaction tag is not associated with the first customer computing device;
compare the second preconfigured risk threshold with the increased risk of fraud associated with the third online transaction;
based on the comparison of the second preconfigured risk threshold with the increased risk of fraud associated with the third online transaction, generate a second risk data packet comprising (a) the device identifier associated with the first customer computing device and (b) an electronic indication of the increased risk of fraud associated with the third online transaction; and
transmit the second risk data packet to the first network service device and to the second network service device.

8. A computer-implemented method comprising:
accessing, from a first customer computing device, a first transaction tag comprising an encrypted first timestamp having a first timestamp format associated with the first customer computing device, the encrypted first timestamp associated with a first online transaction, and a first time during the first online transaction;
determining a preconfigured risk threshold associated with the first online transaction;
decrypting the first transaction tag to determine the first timestamp format;
accessing, from the first customer computing device or a second computing device, a second transaction tag comprising an encrypted second timestamp having a second timestamp format, the encrypted second timestamp associated with a second online transaction and a second time during the second online transaction, the first online transaction subsequent to the second online transaction;
decrypting the second transaction tag to determine the second timestamp format;
comparing the first timestamp format and the second timestamp format;
based at least in part on the comparison, determining that the first timestamp format varies from the second timestamp format and determining that the first transaction tag and the second transaction tag were created within a predetermined time interval;
based at least in part on the determination that the first timestamp format varies from the second timestamp format and the determination that the first transaction tag and the second transaction tag were created within a predetermined time interval, associating an increased risk of fraud with the first online transaction, wherein the increased risk of fraud is indicative of a likelihood that the second transaction tag is not associated with the first customer computing device;

comparing the increased risk of fraud with the preconfigured risk threshold;

based on the comparison of the increased risk of fraud with the preconfigured risk threshold, generating a risk data packet comprising (a) a device identifier associated with the first customer computing device, and (b) an electronic indication of the increased risk of fraud associated with the first online transaction;

transmitting the risk data packet to a first network service device associated with a first institution; and facilitating transmission of the risk data packet from the first network service device to a second network service device associated with a second institution.

9. The computer-implemented method of claim 8, wherein:

the first time is a time of creation of the first transaction tag; and the second time is a time of creation of the second transaction tag.

10. The computer-implemented method of claim 8, wherein:

the increased risk of fraud is further associated with the first transaction tag and the second transaction tag; and the risk data packet further comprises an electronic indication of the increased risk of fraud associated with the first transaction tag and the second transaction tag.

11. The computer-implemented method of claim 8, wherein the first transaction tag comprises at least one of following customer personal information: name, address, billing or shipping information, phone number, driver license number, email address, or credit card number.

12. The computer-implemented method of claim 8, wherein the first transaction tag comprises at least one of following non-personal information: IP address or browser ID, device settings, delta-of-time parameter.

13. The computer-implemented method of claim 8, further comprising:

based at least in part on the comparison between the first timestamp format and the second timestamp format, determining that the first timestamp format remains consistent during the first and second online transactions.

14. The computer-implemented method of claim 13, further comprising:

during a third online transaction subsequent to the first online transaction:

determining a second preconfigured risk threshold associated with the third online transaction;

accessing a third transaction tag comprising an encrypted third timestamp having a third timestamp format, the encrypted third timestamp associated with the third online transaction, wherein the third transaction tag is generated at a third time during the third online transaction;

decrypting the third transaction tag to determine the third timestamp format;

comparing the third timestamp format and the first timestamp format;

based at least in part on the comparison between the third timestamp format and the first timestamp format, determining that the third timestamp format varies from the first timestamp format and determining that the first transaction tag and the third transaction tag were created within the predetermined time interval;

based at least in part on the determination that the third timestamp format varies from the first timestamp format and the determination that the first transaction tag and the third transaction tag were created within the predetermined time interval, associating an increased risk of fraud with the third transaction, wherein the increased risk of fraud associated with the third online transaction is indicative of a likelihood that the third transaction tag is not associated with the first customer computing device;

comparing the second preconfigured risk threshold with the increased risk of fraud associated with the third online transaction;

based on the comparison of the second preconfigured risk threshold with the increased risk of fraud associated with the third online transaction, generating a second risk data packet comprising (a) the device identifier associated with the first customer computing device and (b) an electronic indication of the increased risk of fraud associated with the third online transaction; and transmitting the second risk data packet to the first network service device and the second network service device.

15. A non-transitory computer storage medium storing computer-executable instructions that, when executed a processor, cause the processor to perform the following steps:

determining a preconfigured risk threshold associated a first online transaction;

accessing, from the first customer computing device, a first transaction tag comprising an encrypted first timestamp having a first timestamp format associated with the first customer computing device, the encrypted first timestamp associated with a first online transaction, and a first time during the first online transaction;

decrypting the first transaction tag to determine the first timestamp format;

accessing, from the first customer computing device or a second computing device, a second transaction tag comprising an encrypted second timestamp having a second timestamp format, the encrypted second timestamp associated with a second online transaction and a second time during the second online transaction, the first online transaction subsequent to the second online transaction;

decrypting the second transaction tag to determine the second timestamp format;

comparing the first timestamp format and the second timestamp format;

based at least in part on the comparison, determining that the first timestamp format varies from the second timestamp format and determining that the first transaction tag and the second transaction tag were created within a predetermined time interval;

based at least in part on the determination that the first timestamp format varies from the second timestamp format and the determination that the first transaction tag and the second transaction tag were created within the predetermined time interval, associating an increased risk of fraud with the first online transaction wherein the increased risk of fraud is indicative of a likelihood that the second transaction tag is not associated with the first customer computing device;

comparing the increased risk of fraud with the preconfigured risk threshold;
based on the comparison of the increased risk of fraud with the preconfigured risk threshold, generating a risk data packet comprising (a) a device identifier associated with the first customer computing device, and (b) an electronic indication of the increased risk of fraud associated with the first online transaction;
transmitting the risk data packet to a first network service device associated with a first institution; and
facilitating transmission of the risk data packet from the first network service device to a second network service device associated with a second institution.

16. The non-transitory computer storage medium of claim 15, wherein:
the first time is a time of creation of the first transaction tag; and
the second time is a time of creation of the second transaction tag.

17. The non-transitory computer storage medium of claim 15, wherein:
the increased risk of fraud is further associated with the first transaction tag and the second transaction tag; and
the risk data packet further comprises an electronic indication of the increased risk of fraud associated with the first transaction tag and the second transaction tag.

18. The non-transitory computer storage medium of claim 15, wherein the first transaction tag comprises at least one of following customer personal information: name, address, billing or shipping information, phone number, driver license number, email address, or credit card number.

19. The system of claim 1, wherein the preconfigured risk threshold is determined in response to information from the first network service device.

20. The computer-implemented method of claim 8, wherein the preconfigured risk threshold is determined by the first network service device.

* * * * *